United States Patent
Hadzic

(10) Patent No.: US 11,629,007 B2
(45) Date of Patent: Apr. 18, 2023

(54) RACK STORAGE SYSTEM AND RACK FRAME PART FOR A RACK STORAGE SYSTEM

(71) Applicant: TGW Mechanics GmbH, Wels (AT)

(72) Inventor: Mirzet Hadzic, Wels (AT)

(73) Assignee: TGW Mechanics GmbH, Wels (AT)

( * ) Notice: Subject to any disclaimer, the term of this patent is extended or adjusted under 35 U.S.C. 154(b) by 0 days.

(21) Appl. No.: 17/614,004

(22) PCT Filed: May 26, 2020

(86) PCT No.: PCT/AT2020/060211
§ 371 (c)(1),
(2) Date: Nov. 24, 2021

(87) PCT Pub. No.: WO2020/237271
PCT Pub. Date: Dec. 3, 2020

(65) Prior Publication Data
US 2022/0219898 A1 Jul. 14, 2022

(30) Foreign Application Priority Data

May 27, 2019 (AT) .......................... GM 50087/2019

(51) Int. Cl.
*B65G 1/04* (2006.01)
*B65G 1/02* (2006.01)
(Continued)

(52) U.S. Cl.
CPC .............. *B65G 1/02* (2013.01); *A47B 47/027* (2013.01); *A47B 57/18* (2013.01);
(Continued)

(58) Field of Classification Search
CPC ............ A47B 2230/08; A47B 96/1408; A47B 96/1458; A47B 57/18; A47B 47/027;
(Continued)

(56) References Cited

U.S. PATENT DOCUMENTS

| | | | |
|---|---|---|---|
| 2,327,587 A * | 8/1943 | Attwood | B65G 1/02 211/60.1 |
| 2,894,641 A * | 7/1959 | Edwards, Jr. | A47B 47/022 414/266 |

(Continued)

FOREIGN PATENT DOCUMENTS

| | | |
|---|---|---|
| AT | 521359 A4 | 1/2020 |
| CA | 2631058 A1 | 11/2008 |

(Continued)

OTHER PUBLICATIONS

International Search Report in PCT/AT2020/060211, dated Sep. 22, 2020.

*Primary Examiner* — Devin K Barnett
(74) *Attorney, Agent, or Firm* — Collard & Roe, P.C.

(57) ABSTRACT

A rack storage system includes storage racks forming unit load storage locations arranged next to one another on storage planes on top of one another. The racks include either exclusively outer storage racks or outer and inner storage racks and are installed stationarily on a bottom plate. One or multiple rack aisles are between the racks in an x-direction. Automated storage and retrieval units transport unit loads and building walls are mounted on the outer racks via a support structure and form wall elements. The support structure includes profiled support elements affixed, by spacers, to the outer rack. The wall elements are mounted on the support elements, each being affixed, by respectively one spacer, to the outer rack in separate mounting regions (37) provided separate from one another. An adjuster per spacer adjusts a horizontal distance between a profiled support element and the outer rack. One fixer per spacer fixes the adjusted distance.

17 Claims, 12 Drawing Sheets

Figure 1:
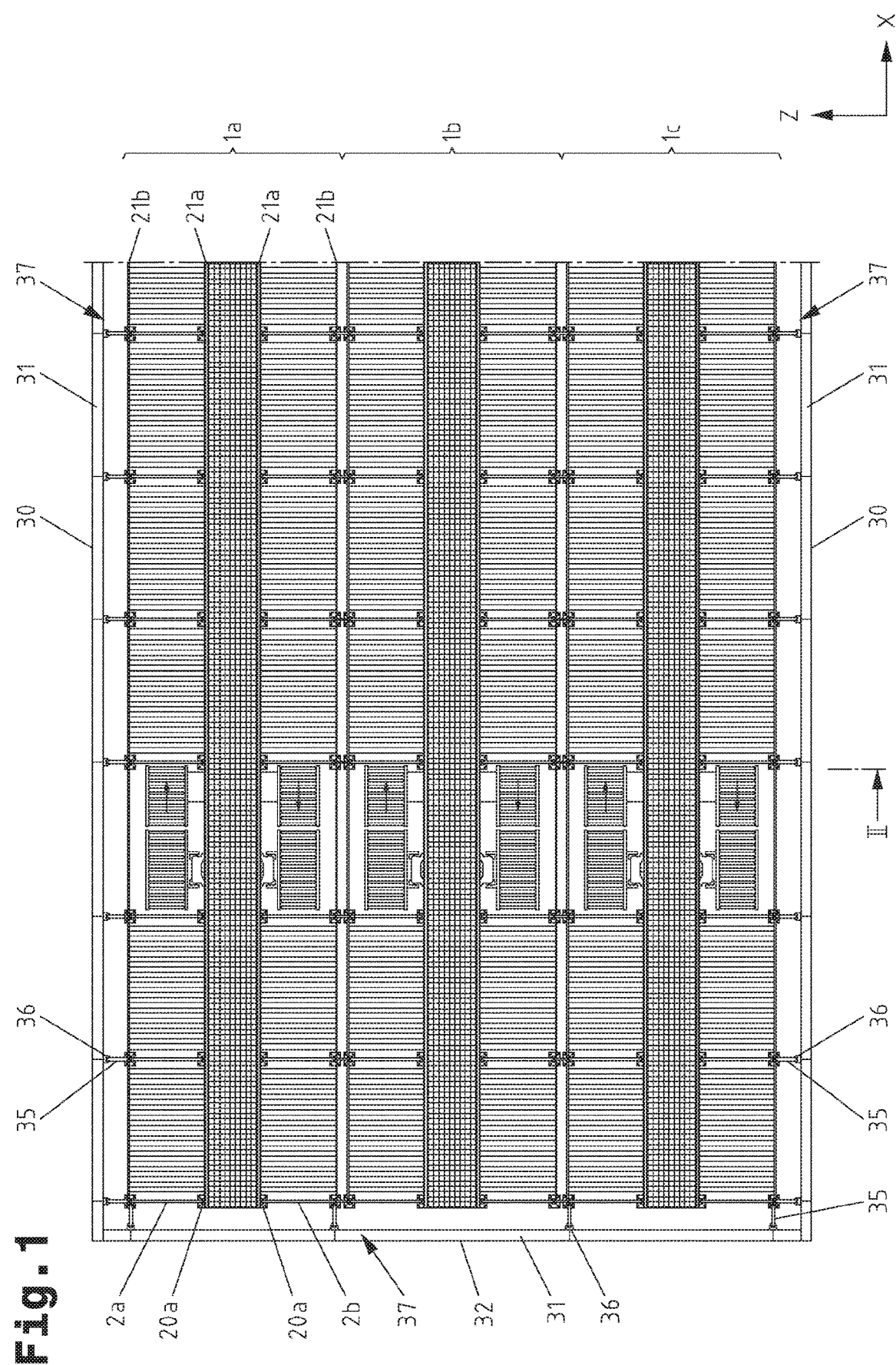

(51) Int. Cl.
*A47B 47/02* (2006.01)
*A47B 57/18* (2006.01)
*A47B 96/14* (2006.01)

(52) U.S. Cl.
CPC ...... *A47B 96/1408* (2013.01); *A47B 96/1458* (2013.01); *A47B 2230/08* (2013.01)

(58) Field of Classification Search
CPC ..... A47B 47/00; A47B 47/028; A47B 87/001; A47B 87/008; F16M 13/02; B65D 19/40; B65G 1/02
See application file for complete search history.

(56) References Cited

U.S. PATENT DOCUMENTS

| | | | | |
|---|---|---|---|---|
| 3,144,944 | A * | 8/1964 | Mcconnell | A47B 57/50 211/192 |
| 3,266,635 | A * | 8/1966 | Mcconnell | A47B 57/50 211/187 |
| 3,337,061 | A * | 8/1967 | Caudell | B65G 1/02 211/134 |
| 3,391,795 | A * | 7/1968 | Finlayson | A47B 57/50 248/243 |
| 3,523,613 | A * | 8/1970 | Konstant | E04G 7/26 211/182 |
| 3,685,665 | A * | 8/1972 | Atwater | A47B 55/00 52/655.1 |
| 3,727,694 | A * | 4/1973 | Dudzik | A62C 3/002 169/54 |
| 3,770,147 | A * | 11/1973 | Kito | B65G 1/02 211/187 |
| 4,815,613 | A * | 3/1989 | Hollander | A47B 57/44 211/191 |
| 5,161,701 | A * | 11/1992 | Berny | A47B 47/022 108/108 |
| 5,312,004 | A * | 5/1994 | Krummell | B65G 1/08 211/151 |
| 5,459,967 | A | 10/1995 | Bodtker | |
| 6,260,719 | B1 * | 7/2001 | Azzopardi | B65G 1/02 211/189 |
| 6,450,350 | B1 * | 9/2002 | Krummell, Jr. | A47B 47/027 211/183 |
| 6,585,122 | B2 * | 7/2003 | Calleja | A47F 5/01 211/183 |
| 9,066,585 | B2 * | 6/2015 | Kirby | A47B 57/44 |
| 9,375,102 | B2 * | 6/2016 | Troyner | A47F 5/01 |
| 10,035,030 | B2 * | 7/2018 | Pigeon | A62C 3/002 |
| 10,314,395 | B2 * | 6/2019 | McGhee, III | A47B 47/028 |
| 10,322,876 | B2 * | 6/2019 | Preidt | B65G 1/1371 |
| 10,710,803 | B2 * | 7/2020 | Grosse | B65G 1/0435 |
| 11,028,586 | B2 * | 6/2021 | Iellimo | B65G 1/02 |
| 2004/0155003 | A1 * | 8/2004 | Anderson | A47F 5/01 211/183 |
| 2005/0103736 | A1 * | 5/2005 | Calleja | A47B 47/021 211/187 |
| 2006/0237378 | A1 * | 10/2006 | Pellegrino | B65G 1/02 211/29 |
| 2009/0084746 | A1 * | 4/2009 | Rioux | B65G 1/02 211/183 |
| 2010/0054906 | A1 * | 3/2010 | Hartman | B65G 1/02 414/807 |
| 2010/0181274 | A1 * | 7/2010 | Vargo | A47B 47/021 211/187 |
| 2010/0200528 | A1 * | 8/2010 | Tourdot | A47B 53/02 211/175 |
| 2011/0049074 | A1 * | 3/2011 | Woolard | B65G 1/02 211/183 |
| 2012/0185080 | A1 * | 7/2012 | Cyrulik | B65G 1/1373 700/214 |
| 2013/0068705 | A1 * | 3/2013 | Parker | A47B 53/00 211/183 |
| 2013/0105428 | A1 * | 5/2013 | Yaniak | F16B 12/44 403/345 |
| 2015/0101998 | A1 * | 4/2015 | Keck | A47B 47/028 211/49.1 |
| 2015/0336741 | A1 | 11/2015 | Ahammer et al. | |
| 2016/0369941 | A1 * | 12/2016 | Consaul | B65G 1/02 |
| 2017/0138059 | A1 | 5/2017 | Omori et al. | |
| 2017/0252592 | A1 * | 9/2017 | Pigeon | A47B 97/00 |
| 2017/0258221 | A1 * | 9/2017 | Iellimo | B65G 1/02 |
| 2018/0237183 | A1 * | 8/2018 | McGhee, III | A47B 96/14 |
| 2020/0165064 | A1 * | 5/2020 | Harrison | B65G 1/02 |
| 2021/0395015 | A1 * | 12/2021 | Ahammer | B65G 1/06 |

FOREIGN PATENT DOCUMENTS

| | | |
|---|---|---|
| CA | 3122308 A1 | 6/2020 |
| DE | 7403717 U | 5/1974 |
| DE | 2525655 A1 | 12/1976 |
| DE | 2020 191 02977 U1 | 6/2019 |
| EP | 0 418 551 A1 | 3/1991 |
| EP | 0 470 296 A1 | 2/1992 |
| EP | 1 406 021 A1 | 4/2004 |
| EP | 2 419 365 B1 | 6/2013 |
| EP | 2 673 218 B1 | 12/2016 |
| EP | 3 505 466 B1 | 12/2020 |
| JP | H05-32513 U | 4/1993 |
| WO | 2010/118445 A1 | 10/2010 |
| WO | 2012/106745 A1 | 8/2012 |
| WO | 2013/090970 A2 | 6/2013 |
| WO | 2016/033628 A1 | 3/2016 |
| WO | 2016/141395 A1 | 9/2016 |
| WO | 2016/168878 A1 | 10/2016 |
| WO | 2019/020689 A1 | 1/2019 |
| WO | 2019/028546 A1 | 2/2019 |

* cited by examiner

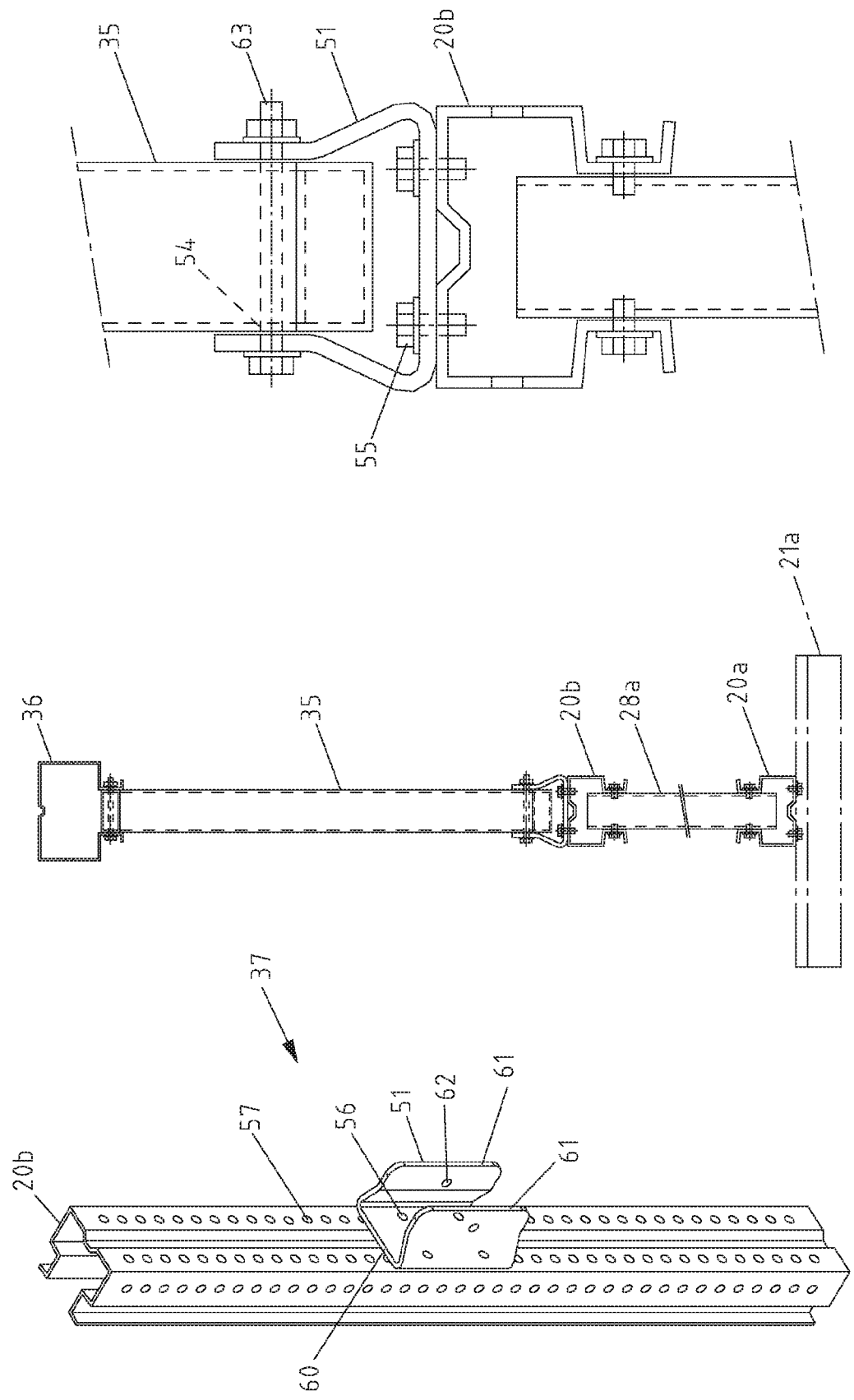

RACK STORAGE SYSTEM AND RACK FRAME PART FOR A RACK STORAGE SYSTEM

CROSS REFERENCE TO RELATED APPLICATIONS

This application is the National Stage of PCT/AT2020/060211 filed on May 26, 2020, which claims priority under 35 U.S.C. § 119 of Austrian Application No. 50087/2019 filed on May 27, 2019, the disclosure of which is incorporated by reference. The international application under PCT article 21(2) was not published in English.

The invention relates to a rack storage system and a rack frame part.

Known from the prior art are rack storage systems which comprise storage racks having storage locations on storage planes located on top of one another, rack aisles between the storage racks in an x-direction and automated storage and retrieval units for transporting unit loads. The storage racks are installed and anchored on a bottom plate. Unit loads are deposited at the storage locations. Unit loads are articles which are stored in containers or cardboard boxes or on pallets. The building walls comprise wall elements which are mounted on the storage racks via a support structure. The (wall) support structure comprises profiled support elements affixed, by means of spacers, to the storage racks, wherein the wall elements are mounted on the profiled support elements. Each profiled support element is affixed, by means of respectively one spacer and at a fixed horizontal distance, to the storage rack in mounting regions provided separate from one another. Usually, the (wall) support structure is a welded construction which is mounted on the storage racks via screws. Equally, the building roof is mounted on the storage racks via a (roof) support structure. Such rack storage systems are known to the person skilled in the art under the term "silo design." This design has several advantages in the erection phase. For instance, a separate building hall is obsolete and the compact design enables a highly efficient use of the existing floor space.

Yet, on the other hand, these known rack storage systems in "silo design" also have considerable disadvantages. For instance, a welded construction is not only manufactured with a high effort but also has a heavy dead weight. This demands a more reinforced construction of the storage racks. Associated with this are higher acquisition costs.

Also problematic are structural deviations which require an adaptation, on location, to the situation existing on the building site. For instance, a deviation of the measurements of the bottom plate can result in the fact that, after installing the storage racks and mounting the support structure, the plate edge and the building wall no longer run in parallel, within a tolerance range. In order to nevertheless achieve an embodiment that is compliant with standards (for example the sealing between building wall and bottom plate), additional construction measures are required which are time-consuming and costly.

Known from US 2017/0138059 A1 is a rack storage system comprising storage racks having storage locations for unit loads which are arranged next to one another on storage planes located on top of one another, a rack aisle between the storage racks in an x-direction and a storage and retrieval unit, operated in an automated manner, for transporting unit loads. The building walls are mounted immediately on the storage racks.

It is an object of the invention to specify an improved rack storage system in "silo design." In particular, a compensation for structurally-related tolerances is to be enabled in the course of the mounting work.

The object of the invention is achieved by additionally providing one adjustment means per spacer, by means of which adjustment means at least one horizontal distance between a profiled support element and the outer storage rack is adjustable, and by additionally providing one fixing means per spacer, by means of which fixing means the adjusted horizontal distance is fixable.

The adjustment means per spacer ensures that at least one horizontal distance between the profiled support element and the outer storage rack can be adjusted. According to a preferred embodiment, the horizontal distance can be adjusted essentially continuously. On the one hand, in the first mounting region, the first spacer and the profiled support element can be positioned relative to each other such that a specified first distance between the profiled support element and the outer storage rack is observed. On the other hand, in the second mounting region, the second spacer and the profiled support element can be positioned relative to each other such that a specified second distance between the profiled support element and the outer storage rack is observed. For example, the first distance and second distance is not adjusted to a theoretical measurement according to the construction plan but to a real actual measurement.

Therefore, (unforeseen) structural deviations can be compensated for i) without additional adaptation work (for example cutting to length the spacers, welding components onto the spacers or profiled support elements and suchlike) on the (wall) support structure or on the bottom plate (for example increasing the bottom plate in size) or ii) without the provision of additional measures (for example the fitting of additional seals between wall elements and bottom plate). Merely the conditions on the building site must be taken into account during the mounting work.

The spacers and profiled support elements for the (wall) support structure can be prefabricated to a standardized final size in the factory; a reworking on the building site is not required. This ensures that the (wall) support structure can be mounted without rework and with great reduction of working time. Also, the mounting can be done with simple tools and by less qualified persons.

In addition, it proves of advantage that the surface area of the bottom plate can be optimized. The bottom plate needs be sized only slightly larger in its surface area in comparison with the base area required for the storage racks and rack aisle(s), as the adjustability of the horizontal distance enables also the course of the (wall) support structure, in particular the distance of the profiled support elements relative to the outer storage racks, to be adapted to deviations from the parallelism or straightness of the plate edges.

It is henceforth also possible to set the outer storage racks up to the minimum distance in relation to the plate edges and anchor them there, for example using screws. In this case, the minimum distance is the distance to the plate edge which is to be observed in order to ensure that the bottom plate does not come out in the periphery by the drilling of the holes.

Overall, also the mounting times for the rack structure and the facade system (building walls) can be reduced considerably, so that an earlier use of the plant is possible.

In accordance with an advantageous embodiment, it may be provided that, in addition to the horizontal distance, also a vertical distance between a profiled support element and the bottom plate is adjustable per spacer by means of the adjustment means and the fixing means is provided per spacer, by means of which fixing means the adjusted horizontal distance and the adjusted vertical distance are fixable.

Therefore, also (unforeseen) deviations in level or unevennesses on the bottom plate will not have negative effects on the mounting of the (wall) support structure. Additional adaptation work i) on the (wall) support structure (for example cutting to length the profiled support elements, welding components onto the profiled support elements and suchlike) or on the bottom plate (for example leveling of the bottom surface) or ii) the provision of additional measures (for example the fitting of additional seals between wall elements and bottom plate) are not required. Merely the conditions on the building site must be taken into account during the mounting work.

It may prove of advantage if the adjustment means comprises at least one row of clearance holes prefabricated on the profiled support element and the spacer comprises a prefabricated clearance hole at the first connection end, and that the fixing means comprises at least one first fixing means, wherein the spacer is directed, with the first connection end, toward the profiled support element and overlaps with the profiled support element such that one of the clearance holes on the profiled support element and the clearance hole on the spacer are located on top of each other in axial alignment, and wherein said clearance hole on the profiled support element and the clearance hole on the spacer are interspersed with the first fixing means, in particular a screw, and that the adjustment means comprises one mounting base per spacer, which mounting base is affixed to the outer storage rack, on which the spacer is supported with its second connection end.

The clearance holes of the row can be provided in a random grid spacing, which increases the flexibility in the selection of mounting positions. In particular, the clearance holes of a row are provided on a datum line and at regular distances. If a high variability of mounting positions is to be provided, the grid spacing merely must be selected smaller.

The mounting bases are affixed to the outer storage rack, in particular respectively to rack frame parts of the storage racks, on top of one another in predefined mounting regions and thus define the vertical positions of the spacers.

By selecting one of the clearance holes inside a first mounting region in which the first spacer is affixed and selecting one of the clearance holes inside a second mounting region in which the second spacer is affixed, the horizontal distance between a profiled support element and the outer storage rack and/or the vertical distance between a profiled support element and the bottom plate can be adjusted. To that end, the first spacer and the profiled support element in the first mounting region are positioned relative to each other and the second spacer and the profiled support element in the second mounting region are positioned relative to each other.

Preferably, the spacers are pivotably supported with the second connection end on the mounting bases in order to enable, during the mounting, a pivoting movement of the spacers relative to the mounting bases. Once the horizontal distance and vertical distance have been adjusted, the first fixing means are used to fix, per spacer, the adjusted horizontal distance and adjusted vertical distance.

In particular, the horizontal distance and/or vertical distance can be adjusted essentially continuously. In this context, "essentially continuously" means if the profiled support element can be moved horizontally relative to the outer storage rack in spacing steps of less than 10 mm. The smaller the grid spacing, the "finer" an adjustment of the horizontal distance is possible.

According to a particularly advantageous embodiment, it is provided that the adjustment means in the mounting regions respectively comprises one mounting base affixed to the outer storage rack and at least one row of clearance holes prefabricated on the profiled support element, wherein the clearance holes comprise first clearance holes and second clearance holes, and the spacer, in the respective mounting region, comprises a first spacer and a second spacer which respectively form a first/second clearance hole at a first connection end and are supported with a second connection end on the mounting base, wherein the first spacer and second spacer are arranged so as to be diverging, starting from the joint mounting base, the fixing means comprises first fixing means, wherein the first spacer and second spacer are directed, respectively with the first connection end, toward the profiled support element and overlap with the profiled support element such that, on the one hand, one of the first clearance holes on the profiled support element and the first clearance hole on the first spacer are located on top of one another in axial alignment and, on the other hand, one of the second clearance holes on the profiled support element and the second clearance hole on the second spacer are located on top of one another in axial alignment, and wherein the first clearance holes of the profiled support element and first spacer are interspersed with one of the first fixing means, in particular a screw, wherein the second clearance holes of the profiled support element and second spacer are interspersed with one of the first fixing means, in particular a screw.

As described above, the clearance holes of the row can be provided in a random grid spacing, also according to this embodiment, which increases the flexibility in the selection of mounting positions. In particular, the clearance holes of a row are provided on a datum line and at regular distances. If a high variability of mounting positions is to be provided, the grid spacing merely must be selected smaller.

The mounting bases are affixed to the outer storage rack, in particular respectively to rack frame parts of the storage racks, on top of one another in predefined mounting regions and thus define the vertical positions of the spacers.

According to this embodiment, a first spacer and second spacer are provided per mounting region.

By selecting, in a first mounting region, one of the first clearance holes to which the first spacer is affixed and selecting one of the second clearance holes to which the second spacer is affixed, as well as by selecting, in a second mounting region, one of the first clearance holes to which the first spacer is affixed and selecting one of the second clearance holes to which the second spacer is affixed, the horizontal distance between a profiled support element and the outer storage rack and/or the vertical distance between a profiled support element and the bottom plate can be adjusted. To that end, the first spacer, second spacer and the profiled support element in the first mounting region are positioned relative to one another, on the one hand, and the first spacer, second spacer and the profiled support element in the second mounting region are positioned relative to one another, on the other hand.

Preferably, the first spacer and second spacer are pivotably supported, per mounting region, with the second connection end on the respective mounting base in order to enable a pivoting movement of the first and second spacers relative to the respective mounting base during the mounting. Once the horizontal distance and vertical distance have been adjusted, the first fixing means are used to fix, per spacer, the adjusted horizontal distance and adjusted vertical distance.

In particular, the horizontal distance and/or vertical distance can be adjusted essentially continuously. In this context, "essentially continuously" means if the profiled support element can be moved horizontally relative to the outer storage rack in spacing steps of less than 10 mm. The smaller the grid spacing, the "finer" an adjustment of the horizontal distance is possible.

If the first spacer and second spacer are arranged so as to be diverging, starting from the joint mounting base, the wind load (surface load—which acts perpendicular to the contact surface and is composed of pressure effects and suction effects) acting upon the building wall can be introduced evenly into the (wall) support structure and rack structure. The (wall) support structure and rack structure can be designed thin-walled in an advantageous manner.

According to one possible embodiment, the support structure comprises profiled support elements aligned essentially parallel to the vertical extent (y-direction) of the outer storage rack and/or the profiled support elements form respectively at least one row of clearance holes, wherein the at least one row extends in direction of the longitudinal extent of the profiled support element.

The clearance holes are arranged either in a row continuing over the entire length of the respective profiled support element or in a row respectively interrupted only in the mounting regions of the respective profiled support element. According to the latter embodiment, however, there is a plurality of clearance holes in each mounting region of the respective profiled support element. The clearance holes can be provided in a random grid spacing, as described above.

The vertical alignment of the profiled support elements, and therefore also of the rows of clearance holes, enables a particularly simple adjustment of a horizontal distance and/or vertical distance.

Particularly preferable is also an embodiment according to which the first spacer and second spacer are respectively inclined in relation to the horizontal line. According to the embodiment, the first spacer is inclined downward or upward, in relation to the horizontal line, in the direction pointing away from the first mounting base, and the second spacer is inclined downward or upward, in relation to the horizontal line, in the direction pointing away from the second mounting base. Here, it is possible for the first spacer and second spacer to be inclined in opposite directions. For example, the first spacer is inclined downward and the second spacer is inclined upward, or vice versa.

Yet it would generally also be conceivable that the first spacer and second spacer extend parallel to each other and same are inclined downward or upward in relation to the horizontal line.

According to an embodiment, the first spacer is inclined downward, in relation to the horizontal line, in the direction pointing away from the joint mounting base, and the second spacer is inclined upward, in relation to the horizontal line, in the direction pointing away from the joint mounting base.

In particular, the length of the spacers is larger than a maximum horizontal distance. This ensures that i) the horizontal distance or ii) the horizontal distance and vertical distance can be adjusted solely by changing the angular position of the spacers relative to the mounting bases. The readjustment region for the horizontal distance is defined by the length of the spacers and is between 150 mm and 500 mm.

According to an advantageous embodiment, it is provided that the profiled support elements are affixed, by means of the spacers, to the outer storage rack, in particular respectively to rack frame parts of the storage racks, such that a bottom edge of the profiled support elements is arranged at a vertical distance to the bottom plate. The adjustment means per spacer ensures that also a vertical distance between a profiled support element and the bottom plate can be adjusted. Therefore, also (unforeseen) deviations in level or unevennesses on the bottom plate will not have negative effects on the mounting of the (wall) support structure. Additional adaptation work i) on the (wall) support structure or on the bottom plate or ii) the provision of additional measures is not required, as is in particular also described above. Merely the conditions on the building site must be taken into account during the mounting work.

In accordance with an advantageous design of the rack storage system, it is provided that the storage rack has front uprights, rear uprights, front longitudinal beams per storage plane extending in the x-direction and connected with the front uprights, rear longitudinal beams per storage plane extending in the x-direction and connected with the rear uprights, and one shelf, having the storage locations, per storage plane, which shelf is arranged between the front longitudinal beam and the rear longitudinal beam.

The storage and retrieval unit is a single-level storage and retrieval unit or a multi-level storage and retrieval unit.

The storage rack has rack frame parts arranged spaced apart in direction of the rack aisle, wherein the rack frame parts respectively comprise the front upright, the rear upright, which is arranged at a horizontal distance to the front upright, first profiled frame elements, which extend horizontally between the front upright and rear upright and are connected respectively with the front upright with their first end and with the rear upright with their second end.

The rack frame part comprises a front upright, a rear upright, first profiled frame elements which extend horizontally between the front upright and rear upright and are connected, in particular releasably connected via screws, respectively with the front upright with their first end and with the rear upright with their second end. The first profiled frame elements keep the front upright and rear upright at a distance. Optionally, also second profiled frame elements may be provided, which are arranged between the first profiled frame elements and extend diagonally between the front upright and rear upright and are connected, in particular releasably connected via screws, respectively with the front upright with their first end and with the rear upright with their second end.

Regardless of whether also the (optional) second profiled frame elements are provided, the front uprights, rear uprights and first profiled frame elements are joined to form a self-supporting frame part. The self-supporting frame part for an outer storage rack is additionally equipped, at the rear upright, with a profiled support element affixed by means of spacers. The profiled support element extends preferably parallel to the rear upright. The frame part for an inner storage rack, in contrast, comprises the self-supporting frame part but not the profiled support element affixed, by means of spacers, to the rear upright.

It proves of particular advantage if guide tracks are provided, respectively in pairs, on the front longitudinal beams of the storage racks in horizontal travel planes located on top of one another, and the at least one storage and retrieval unit is displaceable in the rack aisle, if there is a single rack aisle, or the at least one storage and retrieval unit is displaceable per rack aisle, if there are multiple rack aisles, on a travel plane in front of the storage locations along the guide tracks in the x-direction.

According to this embodiment, the storage and retrieval unit is formed by a single-level storage and retrieval unit. Here, it is possible that more than one single-level storage and retrieval unit is provided in a rack aisle, wherein the single-level storage and retrieval units are operated independently on the different travel planes. Usually, a single-level storage and retrieval unit is provided on each travel plane, even though this is not strictly necessary if a lifting device is provided which can relocate the single-level storage and retrieval units between the travel planes. Such rack storage systems with single-level storage and retrieval units are known from WO 2016/033628 A1 and WO 2016/168878 A1, for example.

In accordance with an advantageous embodiment, it is provided that walkways are arranged in the rack aisle in maintenance planes located on top of one another and affixed to the storage racks using mounting beams extending in the x-direction.

It proves particularly advantageous if the walkways are arranged in the rack aisle in maintenance planes located on top of one another and affixed to the rack frame parts, in particular the front uprights, using mounting beams extending in the x-direction.

The walkways enable not only the access into the rack aisle on different maintenance planes but also serve the reinforcement of the rack structure.

In one possible embodiment, mounting beams arranged in pairs are provided per maintenance plane which are releasably affixed, via connection means, preferably to the front uprights of the storage racks. The walkways comprise grates which are releasably affixed, via connection means, preferably to the mounting beams. In particular screws may be provided as connection means.

It proves of advantage if the inner storage racks are connected with one another, by means of profiled coupling elements, on the rack frame parts. Here, it has proven particularly advantageous if the inner storage racks are connected with one another, by means of profiled coupling elements, in the x-direction in coupling regions provided separate from one another on the rack frame parts facing one another. The profiled coupling elements are affixed, in the coupling regions, preferably to the rack frame parts of the inner storage racks. In particular, the profiled coupling elements are affixed to the rear uprights of the rack frame parts. This results in an additional reinforcement of the rack structure.

A deflection of the rack structure, introduced by means of wind force, in relation to a vertical plane has a minimal amplitude. Here, the entire rack structure is uniformly deflected. This ensures that undesired movements of the unit loads at the storage locations can be avoided. The unit loads remain at their storage positions.

If the profiled coupling elements are arranged in a regular longitudinal grid and regular height grid, this creates a particularly torsion-resistant rack structure. The profiled coupling element is a closed profile and is equipped, on its end sides, with connection plates which are releasably affixed, via connection means, preferably to the rear uprights of inner storage racks installed opposite one another. The closed profile is designed as a hollow profile having a cross section which is rectangular-shaped or square, for example. Yet the profiled coupling element may just as well be formed by an open profile and equipped with connection plates on its end sides. The open profile is designed having a cross section which is C-shaped or U-shaped, for example. The connection plates are either prefabricated connection plates which are connected with the profiled coupling element by a material bond, or connection plates manufactured, by means of (cold) forming, as a single piece with same. In particular screws may be provided as connection means.

It proves also of advantage here if the profiled coupling elements are arranged essentially at the height level of the maintenance planes. This ensures that external forces, in particular wind forces (pressure effects and suction effects), are optimally dispersed in the rack structure.

If the front longitudinal beams simultaneously form guide tracks in horizontal travel planes located on top of one another along which single-level storage and retrieval units are moved, as described above, even high wind loads have no disadvantageous effects on the parallelism of the guide tracks, and therefore on the guidance accuracy for the single-level storage and retrieval units. Therefore, a reliable operation of the rack storage system is ensured.

In accordance with one embodiment, the mounting bases are arranged on the rack frame parts of the outer storage racks in mounting regions provided separate from one another. Preferably, the mounting regions are provided on the rack frame parts on top of one another (in y-direction). In particular, the mounting bases are releasably affixed, via connection means, to the rear uprights of the rack frame parts. In particular screws may be provided as connection means. If the mounting bases are arranged in a regular longitudinal grid and regular height grid, external forces, in particular wind forces (pressure effects and suction effects), are introduced, via the wall elements and the spacers, into the rack structure, in particular the rack frame parts, and via these into the floor.

It proves particularly advantageous if the mounting bases are arranged essentially at the height level of the maintenance planes. This ensures that external forces, in particular wind forces (pressure effects and suction effects), are optimally dispersed in the rack structure.

Overall, the above-mentioned measures have a favorable effect on the overall height of the storage racks. For instance, rack heights of 30 meters and over can easily be realized. This enables a high number of storage locations being provisioned while keeping the base area to a minimum.

In accordance with one design of the invention, the rack storage system additionally comprises a building roof, which is mounted on the storage racks via a (roof) support structure and comprises roof elements, which (roof) support structure comprises profiled support elements affixed, by means of height adjustment profiles, to the rack frame parts, wherein the roof elements are arranged on the profiled support elements.

The height adjustment profiles extend parallel to the longitudinal extent of the front upright and rear upright and are releasably connected with the front upright and rear upright, in particular via a clamped connection and/or screwed connection and suchlike. The use of the height adjustment profiles enables the rear uprights and front uprights to be prefabricated having the same length. Different roof inclinations or the height adjustment of unevennesses is done by means of the height adjustment profiles. To that end, the height adjustment profiles are positioned in vertical direction relative to the front/rear upright and respectively fixed in the desired position, in particular screwed using one or multiple screws. The height adjustment profiles can also be designed such that i) the height adjustment profiles can be plugged into a profile hollow of the front upright and rear upright or ii) the front upright and rear upright can be plugged into a profile hollow of the height adjustment profiles.

The height adjustment profiles form an open profile cross section, for example, and are designed U-shaped or C-shaped. The front uprights and/or rear uprights form an open profile cross section, for example, and are designed omega-shaped. Just as well, the height adjustment profiles, front uprights and/or rear uprights may form a closed profile cross section.

The height adjustment profiles may comprise prefabricated rows of clearance holes. Equally, the front upright and rear upright may respectively comprise prefabricated rows of clearance holes. This ensures that a connection between the height adjustment profile and the front upright/rear upright can be formed on the building site without great mounting effort. Merely at least one clearance hole of each row of the height adjustment profile and at least one clearance hole of each row of the front upright/rear upright must be aligned in axial alignment to one another, so that said clearance holes of each row can be interspersed with a fixing means, in particular a screw.

It is an object of the invention to specify an improved rack storage system in "silo design." In particular, a storage rack should be able to be manufactured with low mounting effort.

The object of the invention is achieved by the rack frame part additionally comprising a profiled support element affixed, by means of spacers, to the rear upright, on which profiled support element wall elements of a building wall can be mounted.

The rack frame part comprises a front upright, a rear upright, first profiled frame elements which extend horizontally between the front upright and rear upright and are connected, in particular releasably connected via screws, respectively with the front upright with their first end and with the rear upright with their second end. The first profiled frame elements keep the front upright and rear upright at a distance. Optionally, also second profiled frame elements may be provided which are arranged between the first profiled frame elements and extend diagonally between the front upright and rear upright and are connected, in particular releasably connected via screws, respectively with the front upright with their first end and with the rear upright with their second end.

Regardless of whether also the (optional) second profiled frame elements are provided, the front uprights, rear uprights and first profiled frame elements are joined to form a self-supporting frame part. A profiled support element affixed by means of spacers is additionally provided on the rear upright on the self-supporting frame part in order to form the rack frame part with the (wall) support structure. The profiled support element extends preferably parallel to the rear upright.

The self-supporting frame parts can be prefabricated in the factory or manufactured on the building site.

In order to use the rack frame part for an outer storage rack, in contrast, in a first mounting step, i) the spacer and the profiled support element are mounted on the self-supporting frame part on the building site. However, the spacer and the profiled support element are prefabricated to final size, so that exclusively a mounting, but not a modification, of the components is required on the building site.

If also the adjustment means per spacer is provided, at least one horizontal distance between the profiled support element and the outer storage rack/rack frame part can be adjusted. The horizontal distance is adjusted, in particular adjusted essentially continuously, during the mounting of the spacer and of the profiled support element on the rack frame part.

The horizontal distance is adapted here to the conditions on the building site. This may be done by measuring an actual measurement and adapting, by means of the adjustment means, the horizontal distance to the actual measurement. Accordingly, merely the conditions on the building site must be taken into account during the mounting work. An additional modification, in particular a metal-cutting modification, will be obsolete.

In the second mounting step ii), rack frame parts for an outer storage rack are installed in succession on the concrete plate and anchored on, for example screwed to, same in a first row in x-direction at mutual distance. The distance is preferably less than 5 meters, in particular between 2.5 meters and 3.5 meters.

In the third mounting step iii), the rack frame parts are connected with one another via the front and/or rear longitudinal beams. The longitudinal beams extend in x-direction and are affixed, for example screwed, to the rack frame parts on top of one another at mutual distance.

In the fourth mounting step iv), rack frame parts for an inner storage rack (which comprises only the self-supporting frame part but not the profiled support element affixed, by means of spacers, to the rear uprights) are installed in succession on the concrete plate and anchored on, for example screwed to, same in a second row in x-direction at mutual distance. The distance is preferably less than 5 meters, in particular between 2.5 meters and 3.5 meters.

The outer storage rack and inner storage rack are installed in z direction at mutual distance, so that a first rack aisle is defined in between, inside which one or multiple storage and retrieval units are arranged. The outer storage rack and inner storage rack are installed in a manner mirror-imaging the first rack aisle.

In the fifth mounting step v), the rack frame parts are connected with one another via the front and/or rear longitudinal beams. The longitudinal beams extend in x-direction and are affixed, for example screwed, to the rack frame parts on top of one another at mutual distance.

If the front longitudinal beams on the outer storage rack and front longitudinal beams on the inner storage rack simultaneously form guide tracks in horizontal travel planes located on top of one another along which single-level storage and retrieval units are moved, as described above, in a sixth mounting step vi), mounting beams extending in the x-direction are affixed, for example screwed, to the rack frame parts of the outer and inner storage rack in maintenance planes located on top of one another, and the walkways are afterward affixed, for example screwed, to the mounting beams facing one another in pairs per maintenance planes.

In a step vii), the shelves can be fitted between the front longitudinal beams and rear longitudinal beams.

The steps i) to vii) repeat if a second rack aisle is provided. In other words, if an inner storage rack and outer storage rack are additionally required.

Here, in the second mounting step ii), rack frame parts for an inner storage rack (which comprises only the self-supporting frame part but not the profiled support element affixed, by means of spacers, to the rear uprights) are installed in succession on the concrete plate and anchored on, for example screwed to, same in a third row in x-direction at mutual distance.

Afterward, mounting step iii) follows.

Here, in the fourth mounting step iv), rack frame parts for an outer storage rack are installed in succession on the concrete plate and anchored on, for example screwed to, same in a fourth row in x-direction at mutual distance.

The outer storage rack and inner storage rack are installed at mutual distance, so that a second rack aisle is defined in between, inside which one or multiple storage and retrieval units are arranged.

Afterward, the mounting steps v) to vii) follow.

The third mounting step iii), fifth mounting step v), sixth mounting step vi) and seventh mounting step vii) are identical with the mounting steps iii), v), vi) and vii) described above.

It proves of advantage if the inner storage rack of the first rack aisle and inner storage rack of the second rack aisle are installed in z direction at mutual distance, wherein this distance is much smaller than the distance which is required to define a rack aisle.

If, according to one possible embodiment, also profiled coupling elements are provided between the inner storage rack of the first rack aisle and inner storage rack of the second rack aisle, in an additional mounting step, these are arranged between and connected with, for example screwed to, the rack frame parts of the inner storage racks.

As will become apparent, the mounting of the storage racks also creates the (wall) support structure, so that only the wall elements (facade) must be mounted on the profiled support elements.

It may also be provided that the mounting of the storage racks creates the (roof) support structure. The (roof) support structure comprises height adjustment profiles additionally mounted on the rack frame parts, as well as the profiled support elements affixed to height adjustment profiles.

To that end, already in the first mounting step i), in addition to the (wall) support structure, as described above, the height adjustment profiles can be mounted on the rack frame parts for the outer storage rack, or outer storage rack and inner storage rack.

On the one hand, a first height adjustment profile is positioned in vertical direction relative to the front upright and connected with the front upright in the desired position, in particular releasably connected with the front upright via a clamped connection and/or screwed connection. On the other hand, a second height adjustment profile is positioned in vertical direction relative to the rear upright and connected with the rear upright in the desired position, in particular releasably connected with the rear upright via a clamped connection and/or screwed connection. The desired position of the first height adjustment profile and second height adjustment profile results from the required roof inclinations.

Preferably, after the steps i) to vi), in one mounting step, a profiled support element is affixed, via fixing means, in particular screws, to the height adjustment profiles, which were affixed, in the step i), to the rack frame part for an outer storage rack and to the rack frame part for an inner storage rack. Accordingly, respectively one profiled support element connects the rack frame parts arranged opposite one another for an outer storage rack and inner storage rack if one rack aisle or two rack aisles are provided, or for a first inner storage rack and second inner storage rack if more than two rack aisles are provided. Finally, also the profiled support elements can be connected with one another, via screwed connecting plates, at their ends facing one another.

As will become apparent, the mounting of the storage racks can also create the (roof) support structure, so that only the roof elements remain to be mounted on the profiled support elements.

The object of the invention is achieved by the rack frame part additionally comprising a height adjustment profile on the front upright and/or rear upright which extends in longitudinal direction of the front upright and/or rear upright and is affixed to the front upright and/or rear upright in a predefined mounting position (desired position) with a first end, and the height adjustment profile forming, at the second end, a mounting region to which a profiled support element of a (roof) support structure is affixable.

The height adjustment profiles form an open profile cross section, for example, and are designed U-shaped or C-shaped. The front uprights and/or rear uprights form an open profile cross section, for example, and are designed omega-shaped. Just as well, the height adjustment profiles, front uprights and/or rear uprights may form a closed profile cross section.

The height adjustment profiles can also be designed such that i) the height adjustment profiles can be plugged into a profile hollow of the front upright and rear upright or ii) the front upright and rear upright can be plugged into a profile hollow of the height adjustment profiles.

According to a preferred embodiment, it is provided that
on the one hand, a first height adjustment profile is positioned in longitudinal direction relative to the front upright and connected with the front upright in a first predefined mounting position, in particular releasably connected with the front upright via a clamped connection and/or screwed connection, and
on the other hand, a second height adjustment profile is positioned in longitudinal direction relative to the rear upright and connected with the rear upright in a second predefined mounting position, in particular releasably connected with the rear upright via a clamped connection and/or screwed connection.

If a clamped connection is provided, on the one hand between the first height adjustment profile and the front upright and on the other hand between the second height adjustment profile and the rear upright, the respective height adjustment profile can be continuously positioned into a predefined mounting position relative to the front upright/rear upright.

Instead of the clamped connection, also a screwed connection, on the one hand between the first height adjustment profile and the front upright and on the other hand between the second height adjustment profile and the rear upright, can be provided.

To that end, the height adjustment profiles comprise prefabricated rows of clearance holes. Equally, the front uprights and rear uprights respectively comprise prefabricated rows of clearance holes.

According to this embodiment, the height adjustment profile is positioned into a predefined mounting position relative to the front upright/rear upright and, in this process, at least one clearance hole of each row of the height adjustment profile and at least one clearance hole of each row of the front upright/rear upright are aligned in axial alignment to one another, so that said clearance holes of each row can be interspersed with a screw. This allows for the respective height adjustment profile to be positioned essentially continuously into a predefined mounting position relative to the front upright/rear upright.

In this context, "essentially continuously" means if the height adjustment profile can be moved relative to the front upright/rear upright in spacing steps of less than 25 mm. The smaller the grid spacing, the "finer" a positioning of the height adjustment profiles is possible. The first mounting position of the height adjustment profile on the front upright and second first mounting position of the height adjustment profile on the rear upright may vary whenever a roof inclination is required.

Moreover, the respective height adjustment profile, at a second end facing away from the front upright/rear upright, comprises a mounting region to which a profiled support element of a (roof) support structure can be affixed.

The mounting region can, again, comprise prefabricated rows of clearance holes. Equally, the profiled support element can comprise one or multiple prefabricated rows of clearance holes.

According to this embodiment, the profiled support element is positioned relative to the height adjustment profiles and, in this process, at least one clearance hole of each height adjustment profile and at least one clearance hole of the profiled support element are aligned in axial alignment to one another, so that the clearance holes of the height adjustment profiles and of the profiled support element can be interspersed with a screw.

Preferably, respectively one profiled support element connects the rack frame parts arranged opposite one another for an outer storage rack and inner storage rack if one rack aisle or two rack aisles are provided, or for a first inner storage rack and second inner storage rack if more than two rack aisles are provided.

Finally, the roof elements are mounted on the profiled support elements of the (roof) support structure.

For the purpose of better understanding of the invention, it will be elucidated in more detail by means of the figures below.

Figure 2:
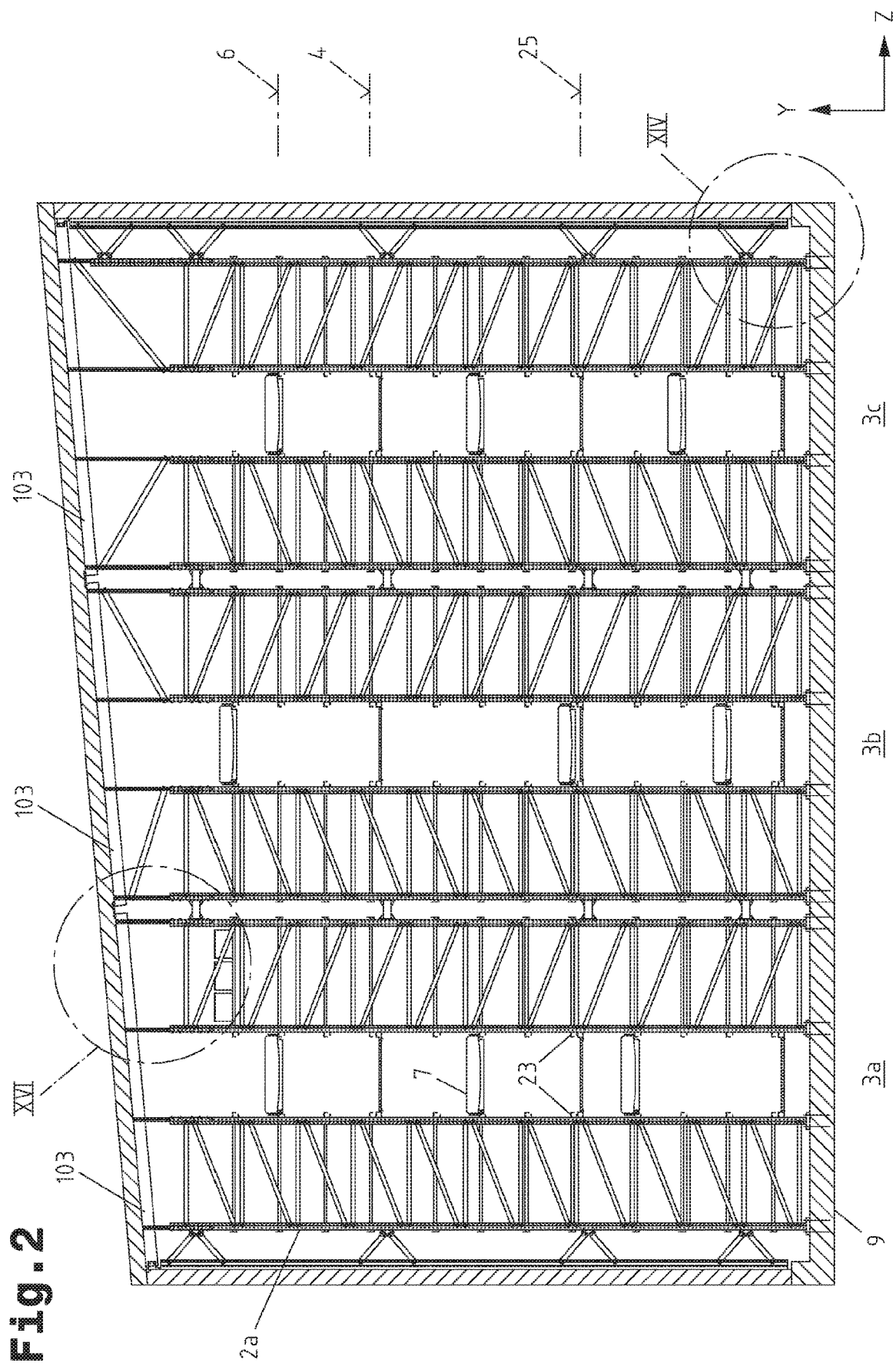
Figure 3:
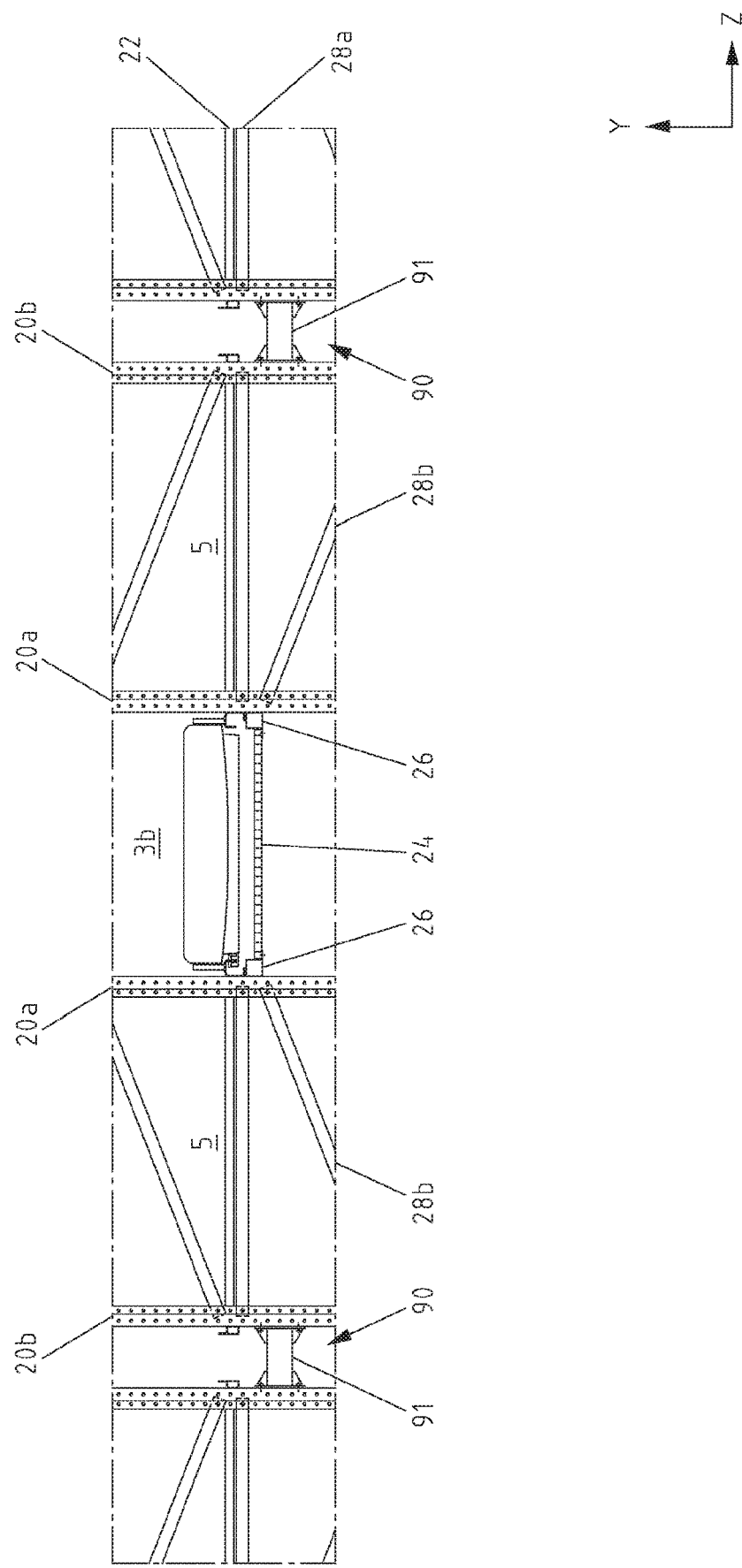
Figure 4:
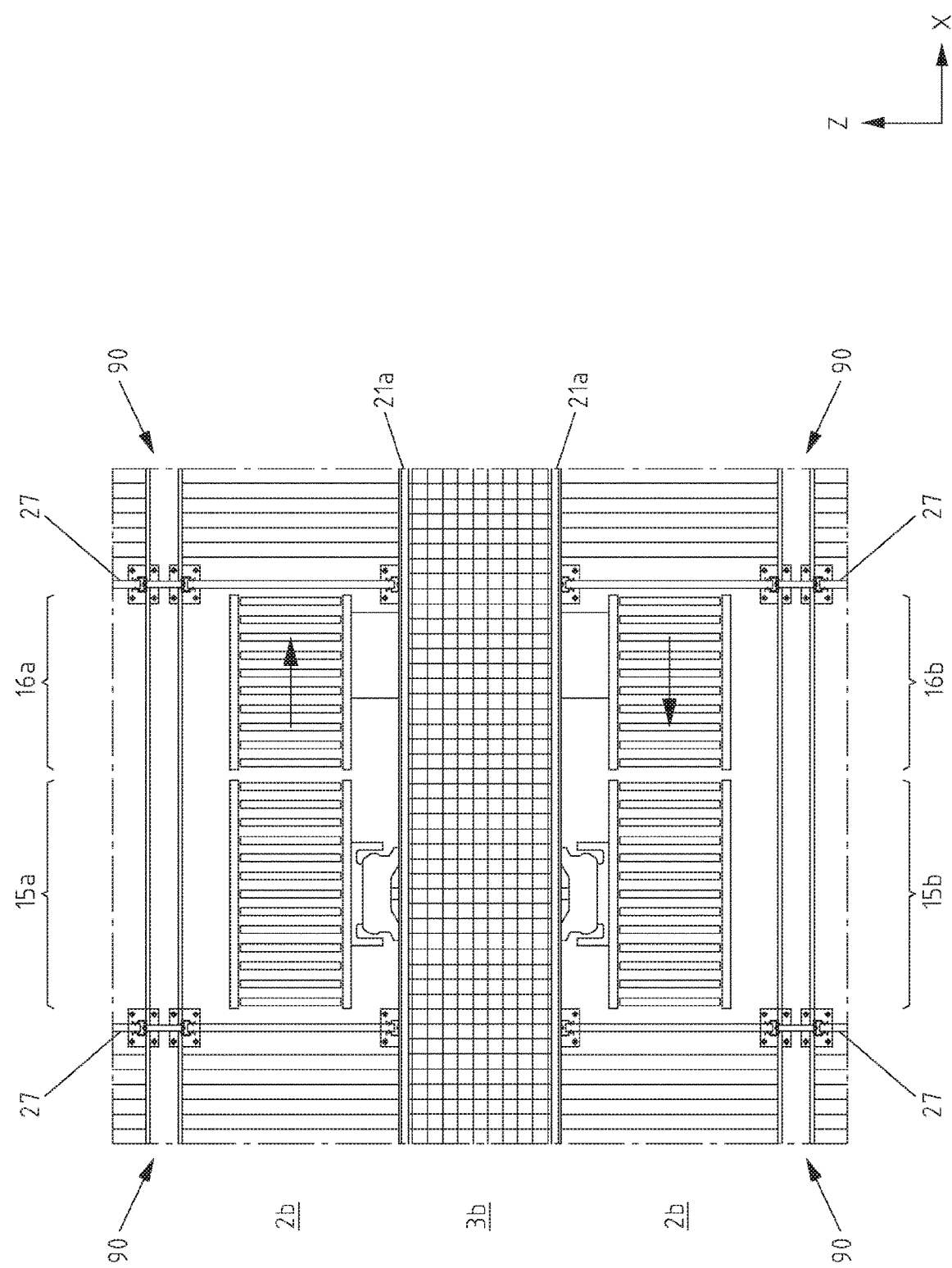
Figure 5:
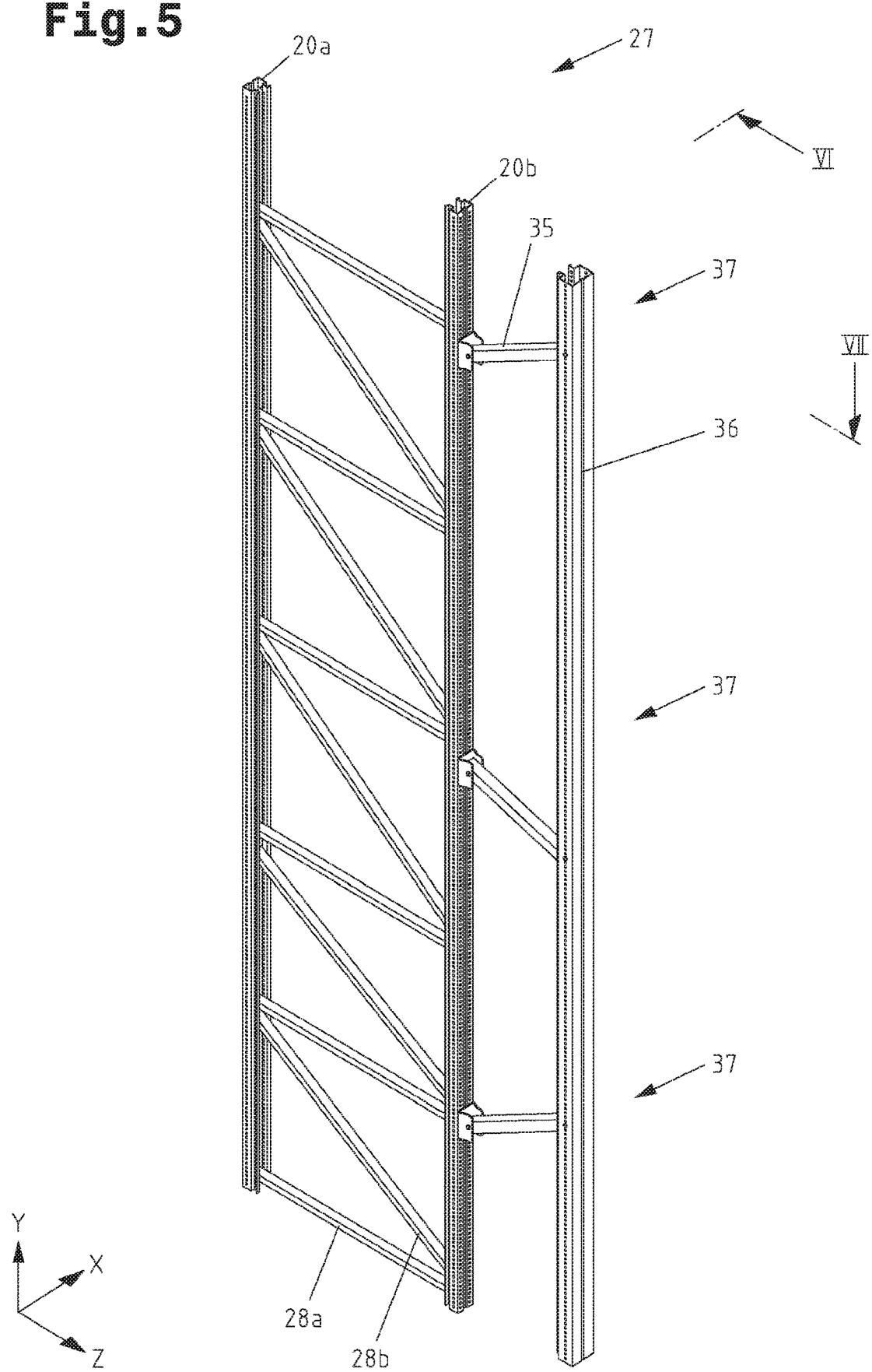
Figure 10:
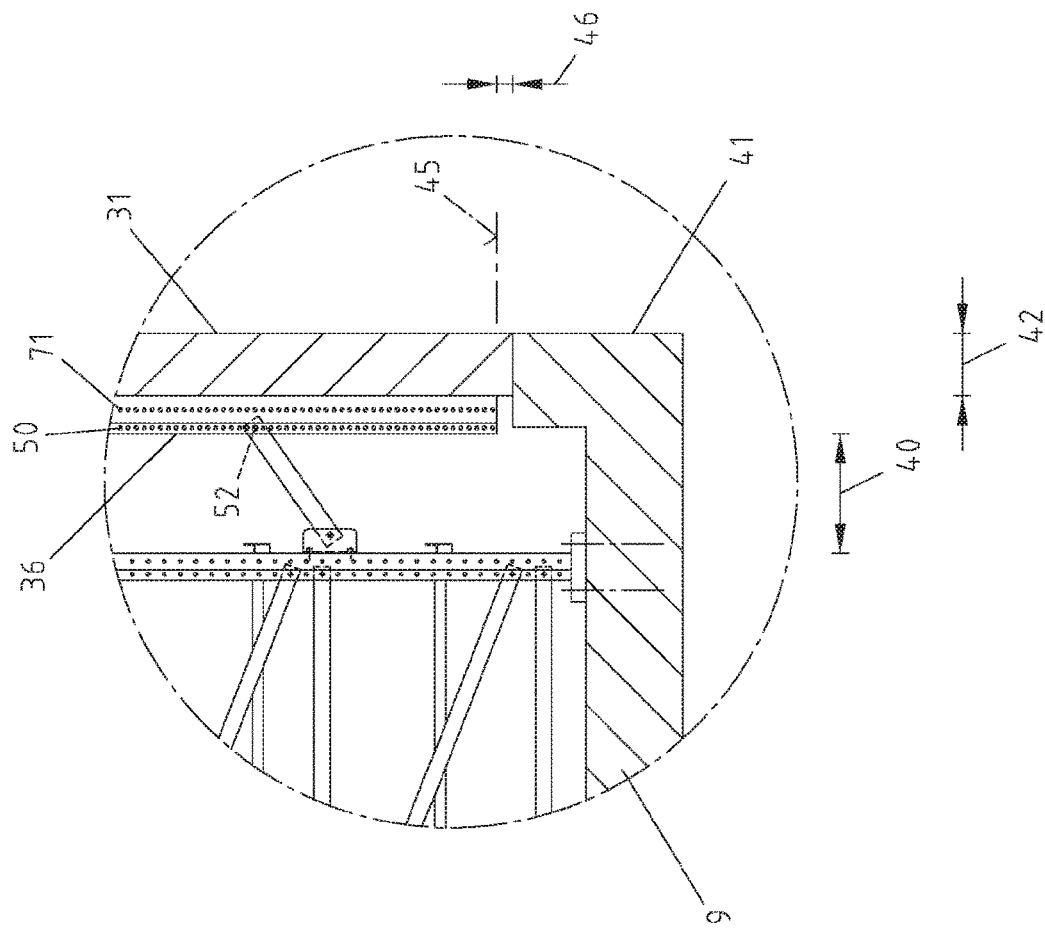
Figure 9:
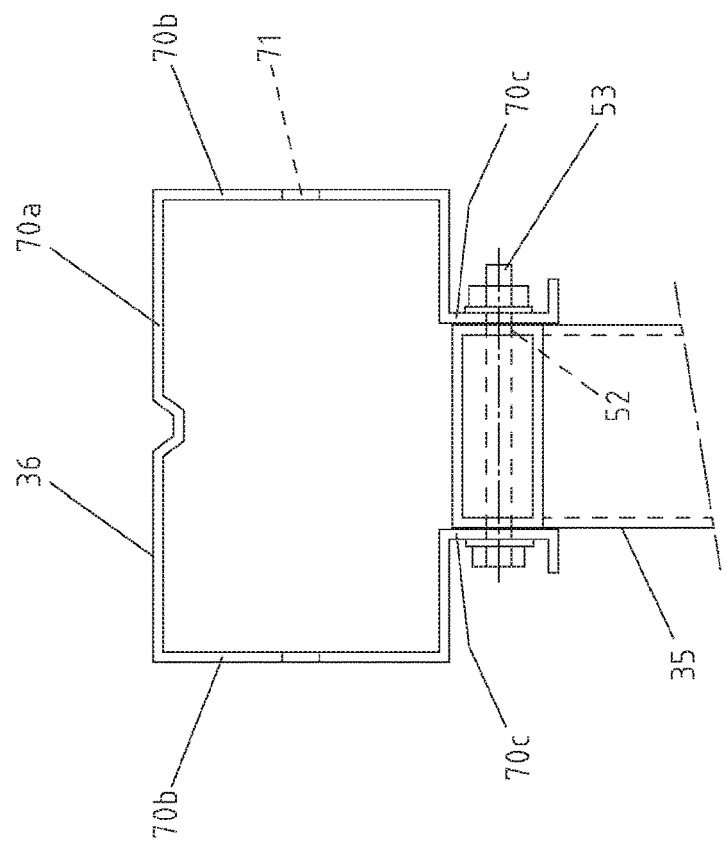
Figure 11:
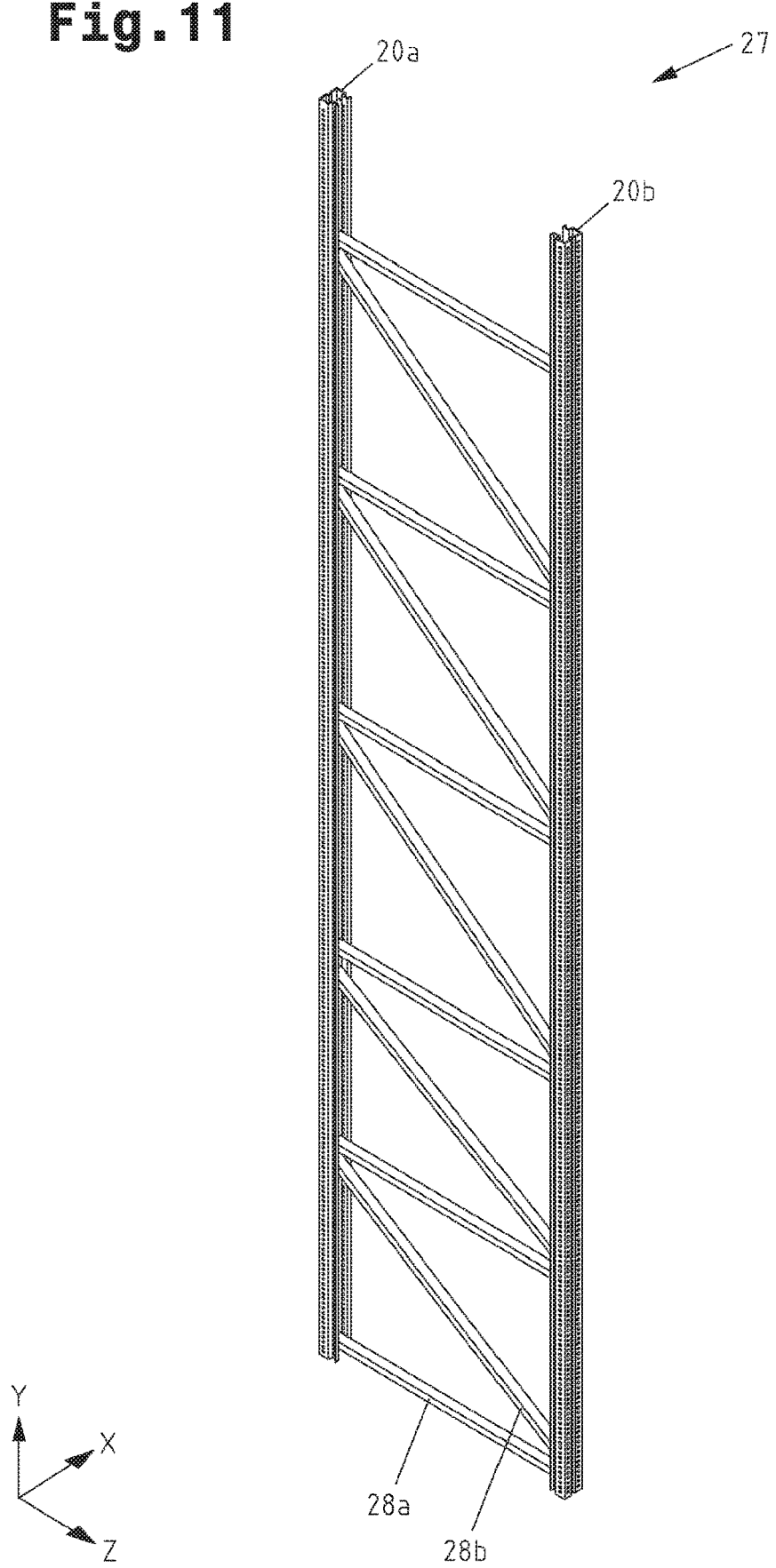
Figure 12:
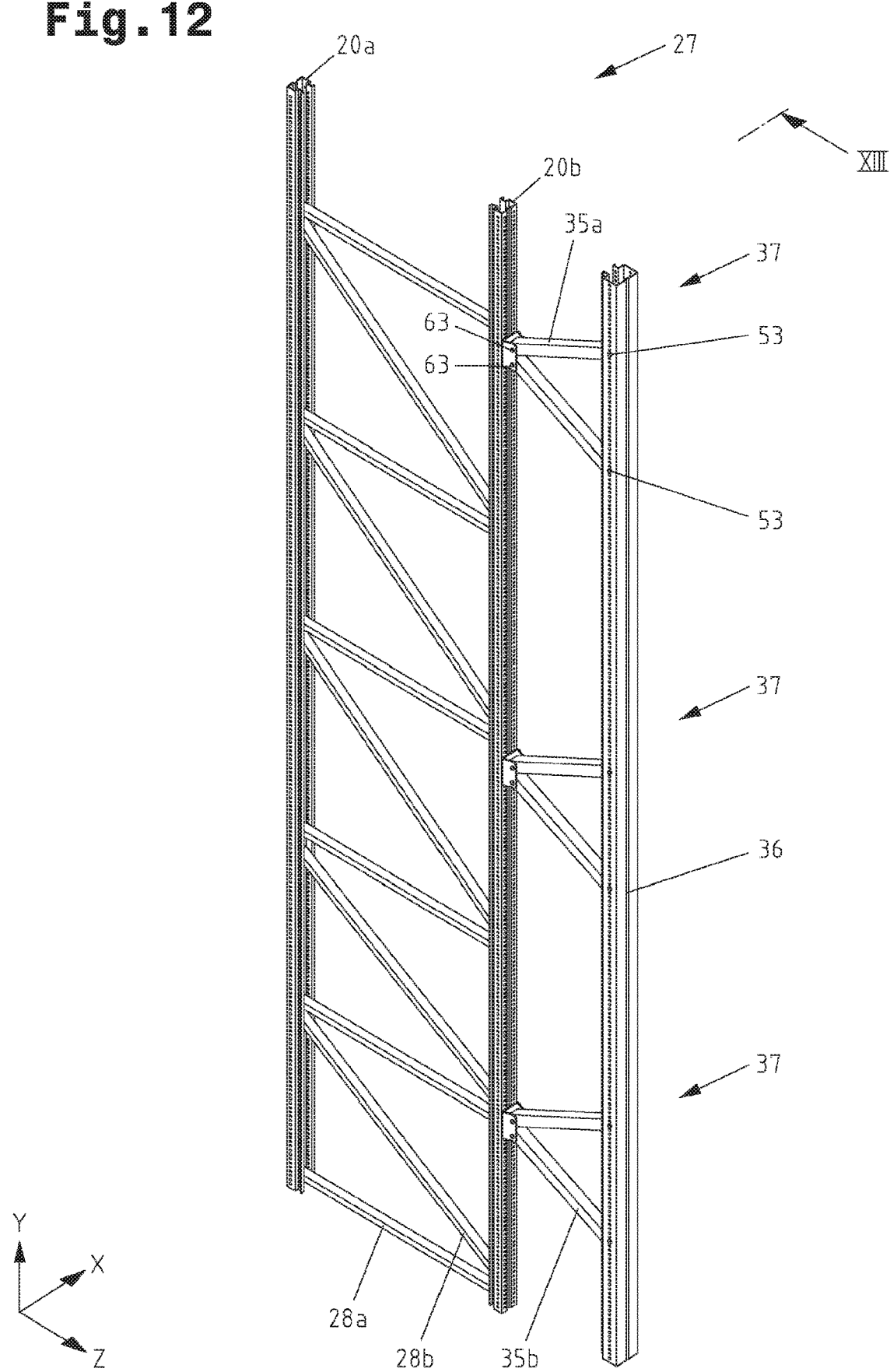
Figure 14:
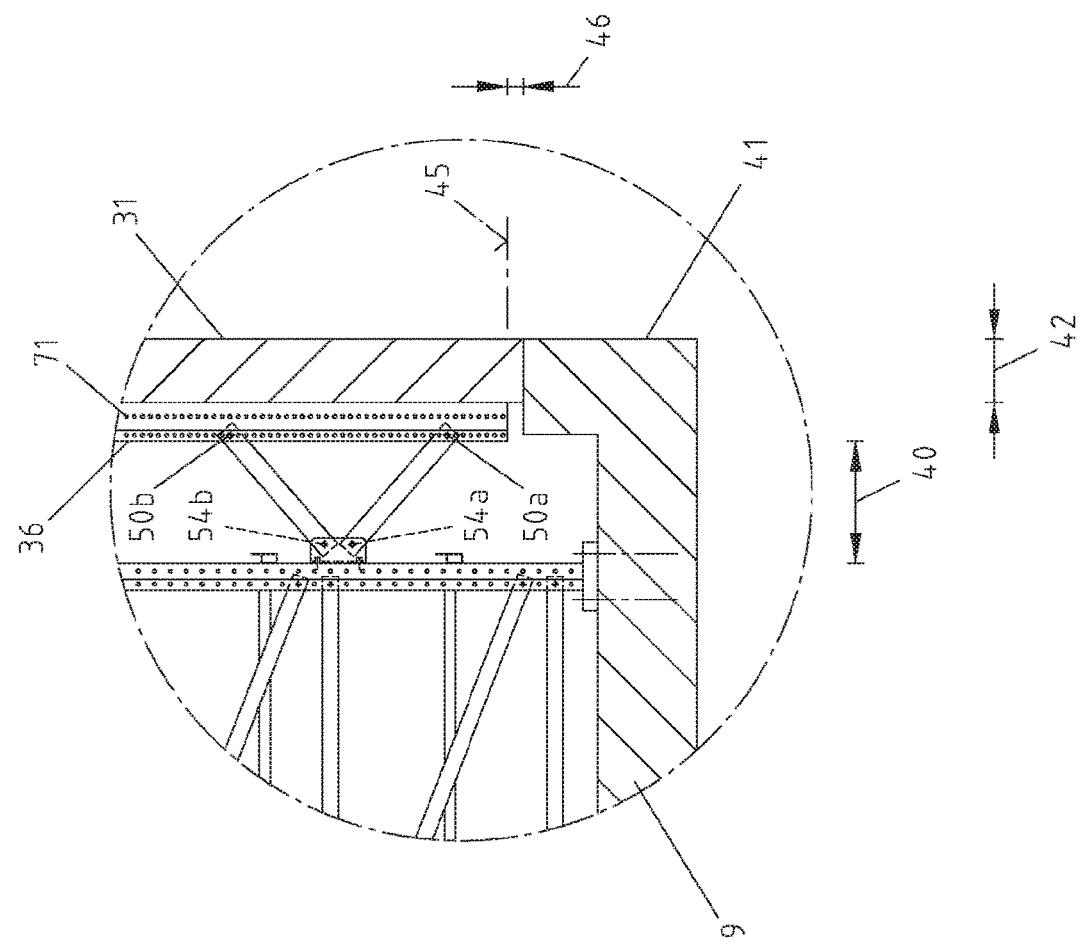
Figure 13:
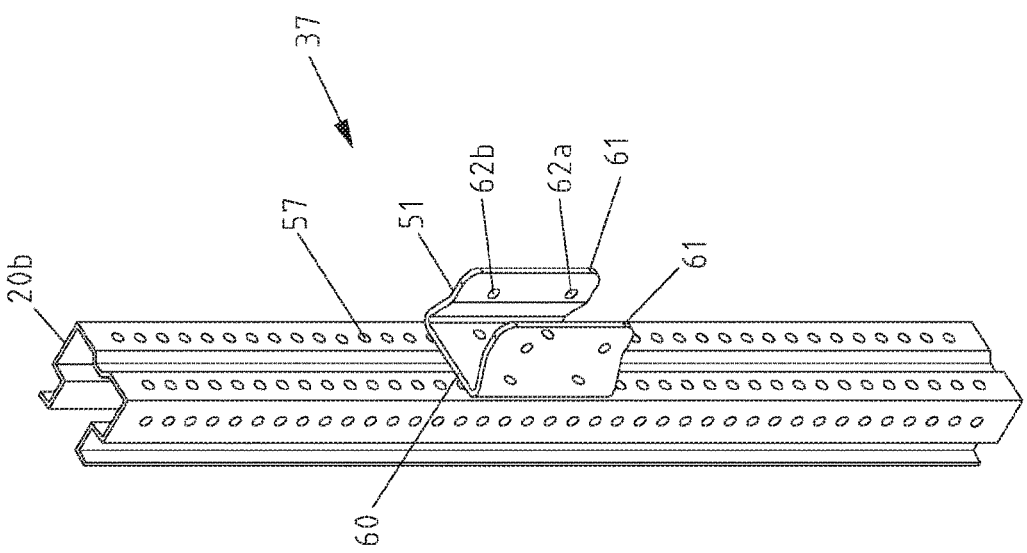
Figure 16:
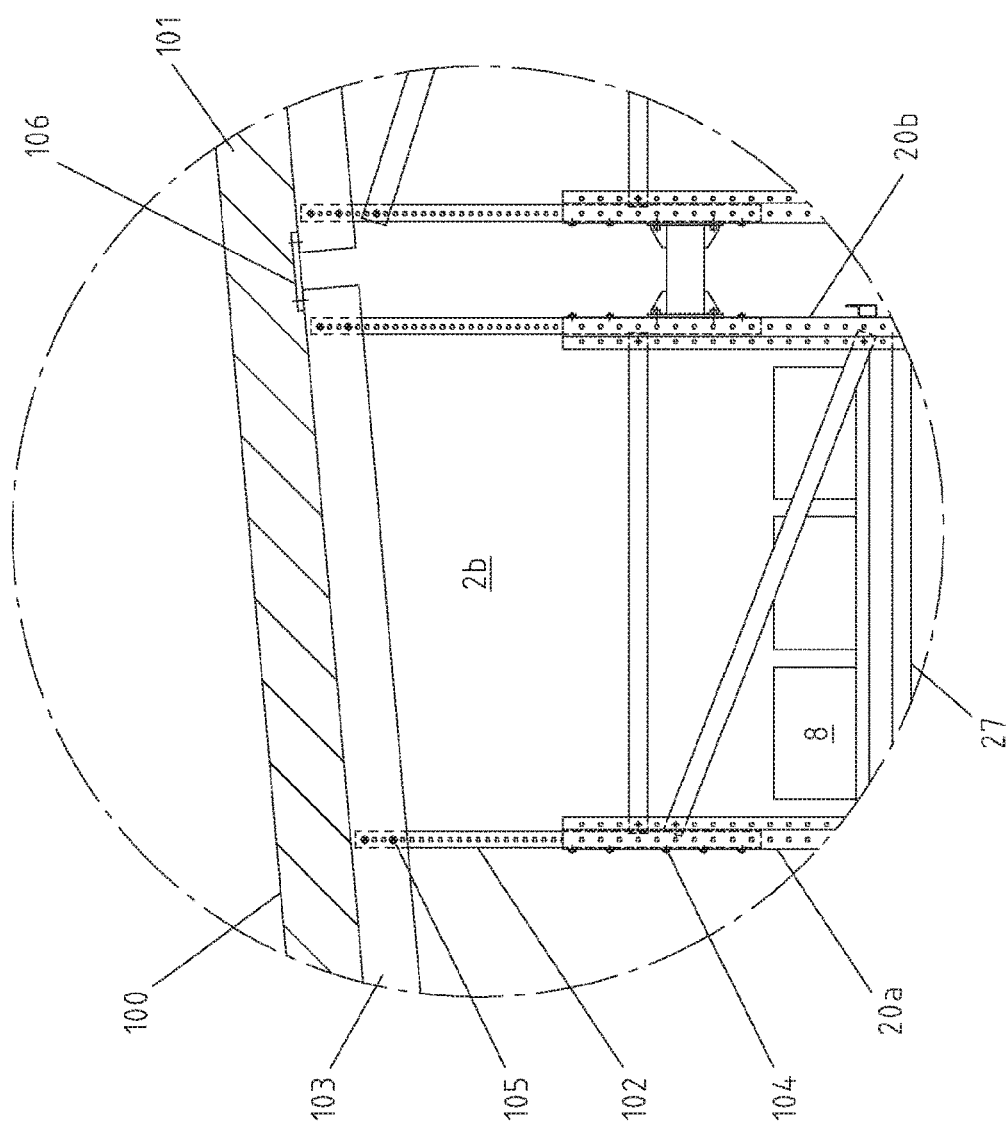
Figure 15:
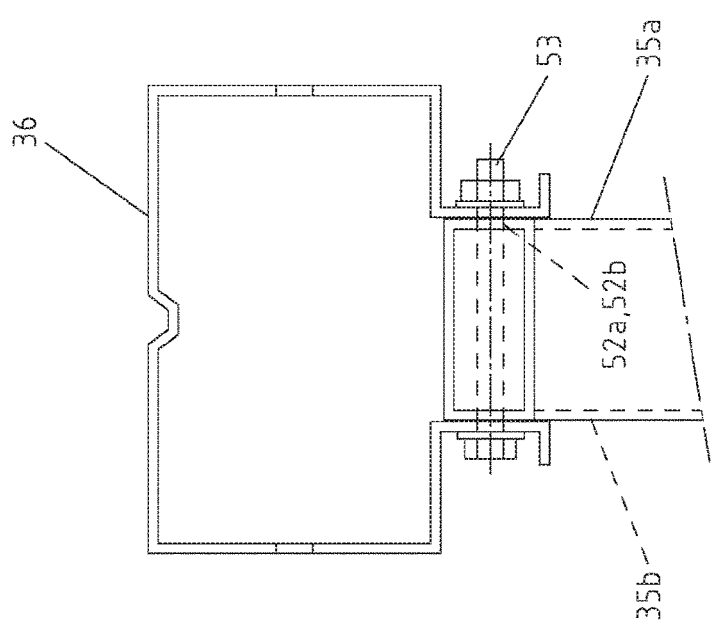
Figure 17:
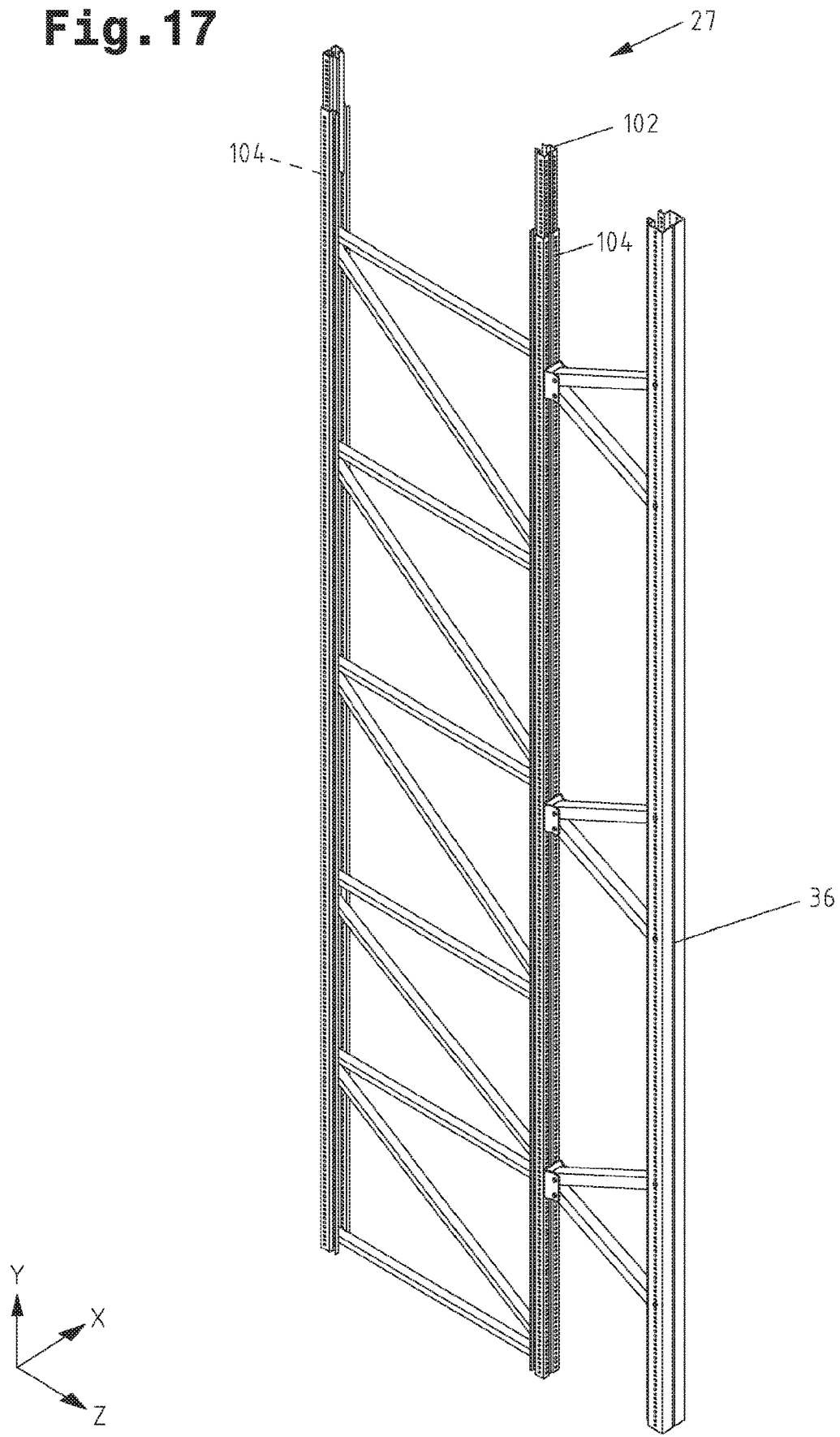

These show in a respectively very simplified schematic representation:

FIG. 1 a possible embodiment of a rack storage system in a top view;

FIG. 2 the rack storage system according to FIG. 1 in a view in accordance with line II;

FIG. 3 an enlarged detail from FIG. 2;

FIG. 4 an enlarged detail from FIG. 1;

FIG. 5 a first embodiment for a (wall) support structure on a rack frame part for an outer storage rack (without height adjustment profiles);

FIG. 6 a mounting region on a rear upright with a view onto a mounting base for an adjustment means, in a view in accordance with line VI in FIG. 5;

FIG. 7 the rack frame part and a section of a front longitudinal beam marked in dash-dotted lines, in a view in accordance with line VII in FIG. 5;

FIG. 8 a first enlarged detail from FIG. 7;

FIG. 9 a second enlarged detail from FIG. 7;

FIG. 10 an enlarged detail from the rack storage system with a rack frame part in a first embodiment;

FIG. 11 a rack frame part for an inner storage rack (without height adjustment profiles);

FIG. 12 a second embodiment for a (wall) support structure on a rack frame part for an outer storage rack;

FIG. 13 a mounting region on a rear upright with a view onto a mounting base for an adjustment means, in a view in accordance with line XIII in FIG. 12;

FIG. 14 an enlarged detail from the rack storage system with a rack frame part in a second embodiment;

FIG. 15 an enlarged detail from FIG. 12 with a top view onto the profiled support element and the spacers;

FIG. 16 an enlarged detail from FIG. 2 with a (roof) support structure;

FIG. 17 height adjustment profiles for the (roof) support structure shown by way of the example of an outer storage rack and mounted on a rack frame part.

First of all, it is to be noted that, in the different embodiments described, equal parts are provided with equal reference numbers and/or equal component designations, where the disclosures filled into in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

FIGS. 1 to 4 show one possible embodiment of a rack storage system.

The rack storage system comprises rack aisle units 1a, 1b, 1c; according to this exemplary embodiment, three rack aisle units 1a, 1b, 1c. Yet it would also be conceivable that the rack storage system comprises merely a single rack aisle unit or more than three rack aisle units 1a . . . 1n. The number of the rack aisle units varies depending on the desired storage capacity.

As can be seen, the rack storage system comprises storage racks 2a, 2b arranged parallel to one another and one or multiple rack aisles 3a, 3b, 3c between the storage racks in x-direction 2a, 2b. The storage racks 2a are specifically outer storage racks, and the storage racks 2b are specifically inner storage racks. The storage racks 2a, 2b comprise storage locations 5 arranged next to one another on storage planes located on top of one another 4. Unit loads 8 can be deposited at the storage locations 5. For reasons of better clarity, it is only in FIGS. 2 and 16 that some unit loads 8 are marked. The storage racks 2a, 2b are installed in a stationary manner on a bottom plate 9.

If a single rack aisle unit 1a is provided, as not represented in more detail, the rack storage system comprises a first outer storage rack 2a, a second outer storage rack 2a and a rack aisle 3a extending between the storage racks 2a in x-direction. Independently controllable storage and retrieval units 7 are arranged in the rack aisle 3a in travel planes 6 located on top of one another.

If a first rack aisle unit 1a and second rack aisle unit 1b is provided, as not represented in more detail, the rack storage system comprises a first outer storage rack 2a, a first inner storage rack 2b, a first rack aisle 3a extending between the first outer storage rack 2a and first inner storage rack 2b in x-direction, a second inner storage rack 2b, a second outer storage rack 2a and finally a second rack aisle 3b extending between the second inner storage rack 2b and second outer storage rack 2b in x-direction. Independently controllable storage and retrieval units 7 are arranged in the first rack aisle 3a in travel planes 6 located on top of one another. Independently controllable storage and retrieval units 7 are arranged in the second rack aisle 3b in travel planes 6 located on top of one another.

According to the exemplary embodiment shown, a first rack aisle unit 1a, second rack aisle unit 1b and a third rack aisle unit 1c is provided. The rack storage system then comprises i) a first outer storage rack 2a, a first inner storage rack 2b and a rack aisle 3a extending between the storage racks 2a, 2b in x-direction. Independently controllable storage and retrieval units 7 are arranged in the first rack aisle 3a in travel planes 6 located on top of one another—for reasons of better clarity, storage and retrieval units 7 are represented exclusively in FIG. 2 and only on some of the travel planes 6, ii) a second inner storage rack 2b, a third inner storage rack 2b and a rack aisle 3b extending between the storage racks 2b in x-direction. Independently controllable storage and retrieval units 7 are arranged in the second rack aisle 3b in travel planes 6 located on top of one another—for reasons of better clarity, storage and retrieval units 7 are represented exclusively in FIG. 2 and only on some of the travel planes 6, and iii) a second outer storage rack 2b, a fourth inner storage rack 2b and a rack aisle 3c extending between the storage racks 2a, 2b in x-direction. Independently controllable storage and retrieval units 7 are arranged in the third rack aisle 3c in travel planes 6 located on top of one another—for reasons of better clarity, storage and retrieval units 7 are represented exclusively in FIG. 2 and only on some of the travel planes 6.

The above-mentioned storage and retrieval units 7 serve the transport of unit loads 8. Specifically, a storage and retrieval unit 7 can be used to store unit loads 8 at the storage locations 5 and retrieve unit loads 8 from the storage locations 5. To that end, the storage and retrieval units 7 respectively comprise a load suspension device not represented in more detail.

In the described embodiments, storage and retrieval units 7 are provided in the rack aisle 3a if the rack storage system comprises a single rack aisle 3a, or per rack aisle 3a, 3b, 3c if the rack storage system comprises multiple rack aisles 3a, and in at least some of the travel planes 6, or in each travel plane 6.

Yet, generally, it is also possible that exclusively one storage and retrieval unit 7 is arranged in the rack aisle 3a if the rack storage system comprises a single rack aisle 3a, or exclusively one storage and retrieval unit 7 is arranged per rack aisle 3a, 3b, 3c if the rack storage system comprises multiple rack aisles 3a, 3b.

The storage and retrieval units 7 can be configured as so-called single-level storage and retrieval units (shuttles), even though also multi-level storage and retrieval units can be used.

The single-level storage and retrieval unit is assigned to a storage plane 4 and services the storage locations 5 of this storage plane 4. If there are fewer single-level storage and retrieval units than travel planes 6, non-represented lifting devices which can relocate a single-level storage and retrieval unit between the travel planes 6 may be provided. Such a lifting device and such a single-level storage and retrieval unit are described in detail in various embodiments in WO 2012/106745 A1 and WO 2016/168878 A1.

A multi-level storage and retrieval unit, in contrast, is assigned to more than one storage plane 4 and services the storage locations 5 of these storage planes 4.

Such a multi-level storage and retrieval unit is described in detail in various embodiments in WO 2010/118445 A1, WO 2016/141395 A1 and WO 2016/033628 A1, FIG. 4 and FIG. 5.

As shown in this exemplary embodiment, the rack storage system may comprise a unit load manipulation unit if the rack storage system comprises a single rack aisle 3a, or a unit load manipulation unit per rack aisle 3a, 3b, 3c if the rack storage system comprises multiple rack aisles 3a, 3b.

The unit load manipulation unit comprises, for example, a first unit load lifting device 15a for storing unit loads 8, a second unit load lifting device 15b for retrieving unit loads 8, a first buffer device 16a for storing unit loads 8 and a second buffer device 16b for retrieving unit loads 8.

The first unit load lifting device 15a for storing unit loads 8 comprises at least one liftable and lowerable transport device, by means of which a unit load 8 can be transported from the first unit load lifting device 15a onto a provisioning device of the first buffer device 16a.

The second unit load lifting device 15b for retrieving unit loads 8 comprises at least one liftable and lowerable transport device, by means of which a unit load 8 can be transported from a provisioning device of the second buffer device 16b onto the transport device of the second unit load lifting device 15b.

The first buffer device 16a for storing unit loads 8 comprises provisioning devices for storing unit loads 8, which provisioning devices are arranged in the x-direction adjacent on one of the sides of the first unit load lifting device 15a and in at least some of the storage planes 4. Preferably, one provisioning device is arranged in each of the storage planes 4.

The second buffer device 16b for retrieving unit loads 8 comprises provisioning devices for retrieving unit loads 8, which provisioning devices are arranged in the x-direction adjacent on one of the sides of the second unit load lifting device 15b and in at least some of the storage planes 4. Preferably, one provisioning device is arranged in each of the storage planes 4.

As not represented in more detail, on the one hand, the first unit load lifting device 15a is adjoined to a first conveying device for storing unit loads 8, by means of which first conveying device the unit loads 8 are transported to the first unit load lifting device 15a, and, on the other hand, the second unit load lifting device 15b is adjoined to a second conveying device for retrieving unit loads 8, by means of which second conveying device the unit loads 8 are transported away from the second unit load lifting device 15b.

Such a unit load manipulation unit is described in the Austrian patent application A 51090/2018, for example.

An alternative embodiment (not shown) consists in the unit load manipulation unit comprising a unit load lifting device for storing and retrieving unit loads 8, a first buffer device 16a for storing unit loads 8 and a second buffer device 16b for retrieving unit loads 8. The first buffer device 16a for storing unit loads 8 is arranged adjacent on the first side of the unit load lifting device in the x-direction and the second buffer device 16b for retrieving unit loads 8 is arranged adjacent on the second side of the unit load lifting device in the x-direction. The unit load lifting device is adjoined, on the one hand, to a first conveying device for storing unit loads 8, by means of which first conveying device the unit loads 8 are transported to the unit load lifting device, and is adjoined, on the other hand, to a second conveying device for retrieving unit loads 8, by means of which second conveying device the unit loads 8 are transported away from the unit load lifting device.

Such a unit load manipulation unit is described in WO 2013/090970 A2, for example.

FIGS. 1 to 10, 12 show the structure of a storage rack which can be used as outer storage rack 2a, and FIGS. 1 to 4, 11 show the structure of a storage rack which can be used as inner storage rack 2b.

The storage rack 2a, 2b comprises front uprights 20a, rear uprights 20b, front longitudinal beams 21a per storage plane 4 extending in the x-direction and connected with the front uprights 20a, rear longitudinal beams 21b per storage plane 4 extending in the x-direction and connected with the rear uprights 20b, and one shelf 22, having the storage locations 5, per storage plane 4, which shelf 22 is arranged between the front longitudinal beam 21a and the rear longitudinal beam 21b. The shelf 22 can comprise crossbars (as represented) and/or support bars extending in parallel in a depth direction of the storage racks 2a, 2b (z direction), or be configured as compartment shelf or as grid shelf.

It is also of advantage if guide tracks 23 are provided in horizontal travel planes 6 located on top of one another and respectively on the front longitudinal beams 21a of the storage racks 2a, 2b. The at least one storage and retrieval unit 7 is displaceable in the rack aisle 3a if there is a single rack aisle, or the at least one storage and retrieval unit 7 is displaceable per rack aisle 3a, 3b, 3c if there are multiple rack aisles, on a travel plane 6 in front of the storage locations 5 along the guide tracks 23 in the x-direction.

According to the embodiment shown, the rack storage system may comprise walkways 24 which are arranged in the rack aisle 3a, 3b, 3c in maintenance planes located on top of one another 25 and affixed to the storage racks 2a, 2b using mounting beams 26 extending in the x-direction.

It proves of advantage if the storage rack 2a, 2b comprises rack frame parts 27 (as represented in more detail in FIGS. 5 and 11) arranged spaced apart in direction of the rack aisle 3a, 3b, 3c (x-direction), wherein the rack frame parts 27 respectively comprise
    the front upright 20a,
    the rear upright 20b, which is arranged at a horizontal distance to the front upright 20a,
    first profiled frame elements 28a (horizontal brace), which extend horizontally between the front upright 20a and rear upright 20b and are connected respectively with the front upright 20a with their first end and with the rear upright 20b with their second end.
The rack frame parts 27 can optionally respectively comprise
    second profiled frame elements 28b (diagonal brace), which are arranged between the first profiled frame elements 28a and extend diagonally between the front upright 20a and rear upright 20b and are connected respectively with the front upright 20a with their first end and with the rear upright 20b with their second end.

Regardless of whether also the (optional) second profiled frame elements 28b are provided, the front upright 20a, rear upright 20b and the first profiled frame elements 28a are joined to form a self-supporting frame part.

Specifically, the rack frame part 27 of FIG. 5 or 12 can be used for an outer storage rack 2a and the rack frame part 27 of FIG. 11 can be used for an inner storage rack 2b.

As can be seen in FIGS. 1 and 2, the rack storage system comprises first building walls 30 which are mounted on the outer storage racks 2a via respectively one (wall) support structure (substructure) and comprise wall elements 31, and second building walls 32 which are mounted on the outer storage racks 2a, or on the outer storage racks 2a and least individual ones (or each) of the inner storage racks 2b, via respectively one (wall) support structure (substructure) and comprise wall elements 31. The first building walls 30 extend parallel to the rack aisle 3a, or rack aisles 3a, 3b, 3c if there are multiple rack aisles 3a, 3b, 3c. The second building walls 32 extend transverse (in particular perpendicular) to the rack aisle 3a, or rack aisles 3a, 3b, 3c if there are multiple rack aisles 3a, 3b, 3c.

If the first building wall 30 is mounted on the respective outer storage rack 2a via the (wall) support structure, it proves of advantage if the (wall) support structure comprises profiled support elements 36 affixed, by means of spacers 35, to the outer storage rack 2a. Specifically, each profiled support element 36 is affixed, by means of respectively one spacer 35, to the outer storage rack 2a, in particular to the rear upright 20b, in mounting regions 37 provided separate from one another. The mounting regions 37 are therefore provided in a direction corresponding to the x-direction extending parallel to the rack aisle(s) and in a direction y-direction extending parallel to the height direction of the storage rack 2a.

The outer storage rack 2a may comprise the rack frame parts 27, as described above, and each rack frame part 27 may additionally comprise a profiled support element 36. The profiled support element 36 is affixed, respectively by means of at least one spacer 35, to the rack frame part 27, in particular the rear upright 21b, in the mounting regions 37 provided separate from one another. The mounting regions 37 are therefore provided on top of one another and per rack frame part 27.

The profiled support elements 36 are therefore arranged spaced apart in direction of the rack aisle 3a, 3b, 3c (x-direction). The profiled support element 36 extends preferably parallel to the rear upright 21b.

If the second building wall 32 is mounted on the respective outer storage rack 2a (if there is one rack aisle 3a) or outer storage rack 2a and inner storage rack 2b (if there are at least one first rack aisle 3a and a second rack aisle 3b) via the (wall) support structure, it proves of advantage if the (wall) support structure comprises profiled support elements 36 affixed, by means of spacers 35, to the outer storage rack 2a, or to the outer storage rack 2a and inner storage rack 2b. Specifically, each profiled support element 36 is affixed, respectively by means of one spacer 35, to the outer storage rack 2a, or outer storage rack 2a and at least one inner storage rack 2b, in particular to the respective rear upright 20b, in mounting regions 37 provided separate from one another.

The outer storage rack 2a and inner storage rack 2b may comprise the rack frame parts 27, as described above, and individual ones (or each) of the rack frame parts 27 which are arranged at the outermost rack end in direction of the rack aisle 3a, 3b, 3c may additionally comprise a profiled support element 36. The profiled support element 36 is affixed, respectively by means of at least one spacer 35, to the rack frame part 27, in particular the rear upright 21b of the outer storage racks 2a and of individual inner storage racks 2b, in the mounting regions 37 provided separate from one another. The profiled support element 36 extends preferably parallel to the rear upright 21b.

Accordingly, the profiled support elements 36 are arranged spaced apart perpendicular to the longitudinal direction of the rack aisle 3a, 3b, 3c (z direction).

As can be seen in FIG. 1, the wall elements 31 of the first building walls 32 and the wall elements 31 of the second building walls 32 are affixed to the profiled support elements 36.

A first embodiment of a (wall) support structure for a first building wall 30 and/or second building wall 32 is represented in FIGS. 5 to 10.

Here, each profiled support element 36 is affixed, respectively by means of a single spacer 35, to the outer storage rack 2a, or outer storage rack 2a and inner storage rack 2b, in particular to the rear upright 20b, in mounting regions 37 separate from one another. An adjustment means is additionally provided per spacer 35.

The adjustment means comprises at least one row of clearance holes 50 prefabricated on the profiled support element 36 and, in the mounting regions 37, respectively one mounting base 51 affixed to the outer storage rack 2a in order to mount the first building wall 30, see FIG. 1.

The adjustment means comprises at least one row of clearance holes 50 prefabricated on the profiled support element 36 and, in the mounting regions 37, respectively one mounting base 51 affixed to the respective outer storage rack 2a, or outer storage rack 2a and inner storage rack 2b, in order to mount the second building wall 32, see FIG. 1.

The spacer 35 comprises a clearance hole 52 at the first connection end. The fixing means comprises at least one first fixing means 53.

On the one hand, the spacer 35 is directed, with the first connection end, toward the profiled support element 36 and is overlapped with the profiled support element 36 such that one of the clearance holes 50 on the profiled support element 36 and the clearance hole 52 on the spacer 35 are located on top of one another in axial alignment, and, on the other hand, the spacer 35 is supported, with its second connection end, on the mounting base 51. The spacer 35 can be equipped, at its second connection end, with a clearance hole 54.

Said clearance hole 50 on the profiled support element 36 and the clearance hole 52 on the spacer 35 are interspersed with the first fixing means 53, in particular a screw, if the spacer 35 and the profiled support element 36 are connected with each other.

The mounting bases 51 are affixed to the rear upright 20b via fixing means 55, in particular screws, in the mounting regions 37, see FIGS. 6 and 8, for example. According to a preferred embodiment, the mounting base 51 may comprise prefabricated clearance holes 56, and the rear upright 20b may comprise prefabricated first rows of clearance holes 57. The mounting base 51 is overlapped with the rear upright 20b such that the clearance holes 56 on the mounting base 51 and clearance holes 57 on the rear upright 20b are located on top of one another in axial alignment and said clearance holes 56, 57 can be interspersed with the fixing means 55, in particular screws, as represented in FIG. 8.

In FIG. 6, the mounting base 51 is represented in more detail. The mounting base 51 comprises a base plate 60 and legs 61 protruding from same in the same direction. The legs 61 taper off in a first leg section with increasing distance from the base plate 60 and extend parallel to each other in a second leg section. An opening width between the legs 61 in the second leg section is essentially identical with a width of the spacer 35, so that same can be received between the legs 61. The clearance holes 56 for the fixing means 57 are in the base plate 60. The legs 61 are equipped with clearance holes 62 which face one another and are arranged and in axial alignment.

The clearance hole 54 on the spacer 35 and the clearance holes 62 on the mounting base 51 are interspersed with the fixing means 63, in particular a screw, if the spacer 35 is supported and/or mounted on the mounting base 51.

The spacer 35 is preferably designed as closed hollow profile having a cross section which is rectangular-shaped or square, for example. Yet the spacer 35 may also be manufactured with an open profile cross section, for example C-shaped or U-shaped cross section.

The profiled support element 36 forms, for example, an open profile cross section and the cross section is designed omega-shaped, C-shaped or U-shaped.

According to the exemplary embodiment shown, the profiled support element 36 is designed omega-shaped.

The profiled support element 36, as can be seen in FIG. 9, comprises a first profile wall 70a and, on this, second profile walls 70b protruding in the same direction and, on the second profile walls 70b, angled-off third profile walls 70c.

The first profile wall 70a forms a mounting surface on which the wall elements 31 are mounted. The second profile walls 70b can respectively be equipped with a prefabricated row of clearance holes 71 which serve the mounting of connecting profiles, mounting profiles and suchlike. The third profile walls 70c are respectively equipped with a prefabricated row of clearance holes 50 which serve the mounting of the spacers 35, as described above. An opening width between the third profile walls 70c is essentially identical with a width of the spacer 35, so that same can be received between the third profile walls 70c.

A second embodiment of a (wall) support structure for a first building wall 30 and/or second building wall 32 is represented in FIGS. 12 to 15.

Here, each profiled support element 36 is affixed, respectively by means of a first spacer 35a and second spacer 35b, to the respective outer storage rack 2a, or outer storage rack 2a and inner storage rack 2b, in particular to the rear upright 20b, in mounting regions 37 separate from one another. An adjustment means is additionally provided per spacer 35.

The adjustment means comprises at least one row of first clearance holes 50a prefabricated on the profiled support element 36 and at least one row of second clearance holes 50b prefabricated on the profiled support element 36 and, in the mounting regions 37, respectively one mounting base 51 affixed to the outer storage rack 2a in order to mount the first building wall 30, see FIG. 1.

The adjustment means comprises at least one row of first clearance holes 50a and second clearance holes 50b prefabricated on the profiled support element 36 and, in the mounting regions 37, respectively one mounting base 51 affixed to the respective outer storage rack 2a, or outer storage rack 2a and inner storage rack 2b, in order to mount the second building wall 32, see FIG. 1.

The first spacer 35a comprises a first clearance hole 52a at the first connection end, and the second spacer 35b comprises a second clearance hole 52b at the first connection end.

The first spacer 35a and second spacer 35b are directed, respectively with the first connection end, toward the profiled support element 36 and are overlapped with the profiled support element 36 such that, on the one hand, one of the first clearance holes 50a on the profiled support element 36 and the first clearance hole 52a on the first spacer 35a are located on top of one another in axial alignment and, on the other hand, one of the second clearance holes 50b on the profiled support element 36 and the second clearance hole 52b on the second spacer 35b are located on top of one another in axial alignment.

The first spacer 35a and second spacer 35b are supported, respectively with the second connection end, on a joint mounting base 51.

Preferably, the first spacer 35a and second spacer 35b are arranged so as to be diverging, starting from the joint mounting base 51.

The first spacer 35a and second spacer 35b can be equipped, on their second connection ends, respectively with a clearance hole 54a, 54b.

The first clearance holes 50a, 52a of the profiled support element 36 and first spacer 35a are interspersed with one of the first fixing means 53, in particular a screw. The second clearance holes 50b, 52b of the profiled support element 36 and second spacer 35b are interspersed with one of the first fixing means 53, in particular a screw.

The mounting base 51 comprises a base plate 60 and, on this, legs 61 protruding in the same direction, as described above. The only difference consists in the fact that the legs 61 form clearance holes 62a assigned to the first spacer 35a which face one another and are arranged in axial alignment, and form clearance holes 62b assigned to the second spacer 35b which face one another and are arranged in axial alignment.

The mounting base 51 is affixed to the rear upright 20b via the fixing means 55, as described above.

The clearance hole 54a on the spacer 35a and the clearance holes 62a on the mounting base 51 are interspersed with the fixing means 63, in particular a screw, if the spacer 35a is supported and/or mounted on the mounting base 51.

The clearance hole 54b on the spacer 35b and the clearance holes 62b on the mounting base 51 are interspersed with the fixing means 63, in particular a screw, if the spacer 35b is supported and/or mounted on the mounting base 51.

As described above, both according to the first embodiment of the (wall) support structure and according to the second embodiment of the (wall) support structure, one adjustment means is additionally provided per spacer 35, 35a, 35b, by means of which adjustment means a horizontal distance 40 between a profiled support element 36 and the respective outer storage rack 2a, or between a profiled support element 36 and outer storage rack 2a/inner storage rack 2b, is adjustable, and one fixing means 53 is additionally provided per spacer 35, 35a, 35b, by means of which fixing means 53 the adjusted horizontal distance 40 is fixable.

As can be seen in FIGS. 10 and 14, the horizontal distance 40 can be varied by means of the adjustment means such that the profiled support elements 36 are arranged with a predetermined clearance 42 relative to the plate edge 41. As shown, the profiled support element 36 is set back, with a predetermined clearance 42, in relation to the plate edge 41. After the wall elements 31 have been fitted, a building wall 30, 32 extends essentially in alignment with the plate edge 41.

Yet it is also possible that the profiled support elements 36 protrude from the plate edge 41 with a predetermined clearance 42 (not represented). After the wall elements 31 have been fitted, a building wall extends in front of the plate edge 41.

The bottom plate 9 may also comprise a base arranged on the plate edge 41, as FIGS. 10 and 14 show.

It proves also of advantage if the profiled support elements 36 of the (wall) support structure for the first building wall 30 are affixed, by means of the spacers 35, 35a, 35b, to the outer storage rack 2a such that a bottom edge 45 of the profiled support elements 36 is arranged on the bottom plate 9 at a vertical distance 46 to the bottom plate 9 and/or the base.

Equally, the profiled support elements 36 of the (wall) support structure for the second building wall 32 are affixed, by means of the spacers 35, 35a, 35b, to the outer storage rack 2a, or outer storage rack 2a and inner storage rack 2b, such that a bottom edge 45 of the profiled support elements 36 is arranged on the bottom plate 9 at a vertical distance 46 to the bottom plate 9 and/or the base.

It is of advantage if the vertical distance 46 between a profiled support element 36 and the bottom plate 9 is adjusted by means of the adjustment means. In addition, the fixing means 53 is provided per spacer 35, 35a, 35b, by means of which fixing means 53 the adjusted horizontal distance 40 and the adjusted vertical distance 46 are fixable.

As can be seen in FIGS. 1 to 10 and 12 to 17 in various embodiments for the (wall) support structure, the length of the spacers 35, 35a, 35b is greater than a maximum horizontal distance 40. This ensures that the profiled support element 36 can be readjusted in horizontal direction (z direction) and vertical direction (y-direction) relative to the outer storage rack 2a, or outer storage rack 2a and inner storage rack 2b, in particular the rear upright 20b. In this way, the horizontal distance 40 and/or the vertical distance 46 can be adjusted. After the positioning in horizontal direction (z direction) and/or vertical direction (y-direction), the profiled support element is fixed, by means of the fixing means 53, 63, in the adjusted position relative to the outer storage rack 2a, or outer storage rack 2a and inner storage rack 2b, in particular the rear upright 20b.

It should also be noted in this context that the mounting bases 51 are provided on top of one another on the outer storage rack 2a, or outer storage rack 2a and inner storage rack 2b, in particular the rear uprights 20b, in mounting regions 37 provided separate from one another.

The mounting bases 51 are arranged, in an advantageous manner, essentially at the height level of the maintenance planes 25.

As has been mentioned above, the rack storage system may comprise outer storage racks 2a and inner storage racks 2b.

In this case, it proves of advantage if the inner storage racks 2b are connected with one another, by means of profiled coupling elements 91, in the x-direction in coupling regions 90 provided separate from one another on the rack frame parts 27 facing one another, in particular the rear uprights 20b, as shown in FIGS. 1 to 4 and 16.

The profiled coupling elements 91 are arranged, in an advantageous manner, essentially at the height level of the maintenance planes 25.

As shown in FIGS. 2, 16 and 17, the rack storage system additionally comprises a building roof 100, which is mounted on the storage racks 2a, 2b via a (roof) support structure and has roof elements 101. The (roof) support structure comprises profiled support elements 103 affixed, by means of height adjustment profiles 102, to the rack frame parts 27, wherein the roof elements 101 are arranged on the profiled support elements 103.

Specifically, the height adjustment profiles 102 are arranged on the front upright 20a and rear upright 20b. It is also possible that a height adjustment profile 102 is arranged either only on the front upright 20a or rear upright 20b. The height adjustment profile 102 extends in longitudinal direction of the front upright 20a and/or rear upright 20b and is affixed, with a first end, to the front upright 20a and/or rear upright 20b in a predefined mounting position via a fixing means 104. In particular screws may be provided as fixing means. The height adjustment profile 102 is, moreover, equipped, on the second end, with a mounting region on which the profiled support element 103 of the (roof) support structure is affixable. The profiled support element 103 is affixed, at the second end, to the respective height adjustment profiles 102 in the mounting region via at least one fixing means 105. In particular screws may be provided as fixing means.

As can also be seen in FIG. 16, the profiled support elements 103 can be connected with one another, via screwed connecting plates 106, at their ends facing one another.

It should be noted in this context that FIG. 17 shows the height adjustment profiles 102 on the rack frame part 27 for an outer storage rack. Likewise, the height adjustment profiles 102 may also be used on the rack frame part 27 for an inner storage rack, such as this is not represented, however.

Finally, it should also be noted that the scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should also be noted that, in reality, the depicted rack storage system can also comprise more, or also fewer, components than depicted. In some cases, the shown rack storage system and/or its components may not be depicted to scale and/or be enlarged and/or reduced in size.

LIST OF REFERENCE NUMBERS 1a, 1b, 1c rack aisle unit
2a, 2b storage rack
3a, 3b, 3c rack aisle
4 storage plane
5 storage location
6 travel plane
7 storage and retrieval unit
8 unit load
9 bottom plate
15a, 15b unit load lifting device
16a, 16b buffer device
20a, 20b upright
21a, 21b longitudinal beam
22 shelf
23 guide track
24 walkway
25 maintenance plane
26 mounting beam
27 rack frame part
28a, 28b frame profile
30 building wall
31 wall element
32 building wall
35 spacer
36 profiled support element
37 mounting region
40 horizontal distance
41 plate edge
42 clearance
45 bottom edge
46 vertical distance
50 clearance hole profiled support element
50a, 50b clearance hole profiled support element
51 mounting base
52 clearance hole spacer at the first connection end
52a, 52b clearance hole spacer at the first connection end
53 fixing means spacer at the first connection end
54 clearance hole spacer at the second connection end
54a, 54b clearance hole spacer at the second connection end
55 fixing means mounting base
56 clearance hole mounting base
57 clearance hole rear upright
60 base plate
61 leg
62 clearance hole mounting base
62a, 62b clearance hole mounting base
63 fixing means spacer at the second connection end
70a profile wall
70b, 70c profile wall
71 clearance hole profiled support element
90 coupling region
91 profiled coupling element
100 building roof
101 roof element
102 height adjustment profile
103 profiled support element
104 fixing means
105 fixing means
106 connecting plate

The invention claimed is:

1. A rack storage system comprising
storage racks which are arranged parallel to one another and comprise storage locations for unit loads, the storage locations being arranged next to one another on storage planes located on top of one another, wherein the storage racks comprise either exclusively outer storage racks or outer storage racks and inner storage racks and are installed in a stationary manner on a bottom plate,
one or multiple rack aisles between the storage racks in an x-direction,
one or multiple automated storage and retrieval units for transporting the unit loads, wherein a corresponding storage and retrieval unit is displaceable in a corresponding rack aisle,
building walls which are mounted on the outer storage racks via support structures and the building walls comprise wall elements, wherein the wall elements are arranged on profiled support elements, wherein the support structures comprise the profiled support elements and each profiled support element is affixed, by means of corresponding spacers, to a corresponding outer storage rack in mounting regions that are separate from one another, wherein an adjustment means is provided per spacer, and a fixing means is provided per spacer, wherein a horizontal distance between a corresponding profiled support element and the corresponding outer storage rack is adjustable by the adjustment means and, horizontal distance is fixable by the fixing means,
wherein:
the adjustment means comprises in each respective mounting region a mounting base affixed to a corresponding outer storage rack and a row of clearance holes prefabricated on a corresponding profiled support element, wherein the row of clearance holes comprises first clearance holes and second clearance holes,
the fixing means comprise screws,
the corresponding spacers comprise, in each respective mounting region, a first spacer and a second spacer, wherein the first spacer forms a first clearance hole and the second spacer forms a second clearance hole at a first connection end respectively,
the first spacer and the second spacer are directed, respectively with the first connection end, toward a corresponding profiled support element and overlap with the corresponding profiled support element such that one of the first clearance holes on the corresponding profiled support element and the first clearance hole on the first spacer are in axial alignment and one of the second clearance holes on the corresponding profiled support element and the second clearance hole on the second spacer are in axial alignment,
the first clearance holes of the corresponding profiled support element and the first spacer are interspersed with one of the screws, the second clearance holes of the corresponding profiled support element and the second spacer are interspersed with another of the screws, and the first spacer and the second spacer are supported, with a second connection end, on a corresponding mounting base, wherein the first spacer and the second spacer diverge away from each other at sloped angles starting from the mounting base.

2. The rack storage system according to claim 1, wherein the adjustment means is configured to adjust a vertical distance between a corresponding profiled support element and the bottom plate, and the fixing means per spacer is configured to fix the adjusted horizontal distance and the adjusted vertical distance.

3. The rack storage system according to claim 1, wherein the profiled support elements are aligned essentially parallel to the vertical extent of the outer storage rack and the at least one row of clearance holes prefabricated on a corresponding profiled support element extends in direction of the longitudinal extent of the profiled support element.

4. The rack storage system according to claim 1, wherein each of the spacers have a respective length greater than a maximum horizontal distance.

5. The rack storage system according to claim 1, wherein each of the profiled support elements is affixed, by means of the corresponding spacers, to the corresponding outer storage rack such that a bottom edge of the profiled support elements is arranged at a vertical distance to the bottom plate.

6. The storage rack according to claim 1, wherein the storage rack comprises front uprights, rear uprights, front longitudinal beams per storage plane extending in the x-direction and connected with the front uprights, rear longitudinal beams per storage plane extending in the x-direction and connected with the rear uprights, and a shelf per storage plane, which shelf comprises the storage locations and is arranged between the front longitudinal beam and the rear longitudinal beam.

7. The rack storage system according to claim 6, wherein the storage rack comprises rack frame parts arranged at mutual distance in direction of the rack aisle, wherein the rack frame parts respectively comprise the front upright,
the rear upright, which is arranged at a horizontal distance to the front upright,
first profiled frame elements, which extend horizontally between the front upright and rear upright and are connected respectively with the front upright with their first end and with the rear upright with their second end.

8. The rack storage system according to claim 7, wherein the inner storage racks are connected with one another, by means of profiled coupling elements (91), in the x-direction in coupling regions provided separate from one another on the rack frame parts facing one another.

9. The rack storage system according to claim 7, wherein the mounting base in each respective mounting region is arranged on the rack frame part of the corresponding outer storage rack.

10. The rack storage system according to claim 6, wherein guide tracks are provided, respectively in pairs, on the front longitudinal beams of the storage racks on horizontal travel planes located on top of one another, and the one or multiple storage and retrieval units are displaceable in the rack aisle, if there is a single rack aisle, or the one or multiple storage and retrieval units are displaceable per rack aisle, if there are multiple rack aisles, on a travel plane in front of the storage locations along the guide tracks in the x-direction.

11. The rack storage system according to claim 1, wherein walkways are arranged in the rack aisle in maintenance planes located on top of one another and are affixed to the storage racks using mounting beams extending in the x-direction.

12. The rack storage system according to claim 11, wherein the profiled coupling elements are arranged essentially at the height level of a corresponding maintenance plane.

13. The rack storage system according to claim 11, wherein each of the mounting bases is arranged essentially at the height level of a respective maintenance plane.

14. The rack storage system according to claim 1, further comprising a building roof which is mounted on the storage racks via a support structure and comprises roof elements, wherein the support structure comprises profiled support elements affixed, by means of height adjustment profiles, to the rack frame parts, wherein the roof elements are arranged on the profiled support elements.

15. A rack frame part for an outer storage rack of a rack storage system, comprising a front upright,
a rear upright, which is arranged at a horizontal distance to the front upright,
first profiled frame elements, which extend horizontally between the front upright and rear upright and are connected respectively with the front upright with their first end and with the rear upright with their second end,
optionally second profiled frame elements, which are arranged between the first profiled frame elements and extend diagonally between the front upright and rear upright and are connected respectively with the front upright with their first end and with the rear upright with their second end,
a profiled support element affixed, by means of corresponding spacers, to the rear upright in mounting regions that are separate from one another, wherein on the profiled support element a wall element of a building wall is mountable,
an adjustment means provided per spacer and a fixing means provided per spacer, wherein a horizontal distance between the profiled support element and the rear upright is adjustable by the adjustment means and the horizontal distance is fixable by the fixing means,
wherein:
the adjustment means comprises in each respective mounting region a mounting base affixed to a corresponding rear upright and a row of clearance holes prefabricated on the profiled support element, wherein the row of clearance holes comprises first clearance holes and second clearance holes,
the fixing means comprise screws,
the corresponding spacers comprise, in each respective mounting region, a first spacer and a second spacer, wherein the first spacer forms a first clearance hole and the second spacer forms a second clearance hole at a first connection end respectively,
the first spacer and the second spacer are directed, respectively with the first connection end, toward the profiled support element and overlap with the profiled support element such that one of the first clearance holes on the profiled support element and the first clearance hole on the first spacer are in axial alignment and one of the second clearance holes on the profiled support element and the second clearance hole on the second spacer are in axial alignment, the first clearance holes of the profiled support element and the first spacer are interspersed with one of the screws, the second clearance holes of the profiled support element and the second spacer are interspersed with another of the screws, and the first spacer and the second spacer are supported, with a second connection end, on a corresponding mounting base, wherein the first spacer and the second spacer diverge away from each other at sloped angles starting from the mounting base.

16. The rack frame part according to claim 15, wherein the adjustment means is configured to adjust a vertical distance between the profiled support element and a bottom plate on which the front upright and the rear upright are installed, and the fixing means per spacer is configured to fix the adjusted horizontal distance and the adjusted vertical distance.

17. The rack frame part according to claim 15, wherein the rack frame part, on the front upright and/or rear upright, additionally comprises a height adjustment profile which extends in longitudinal direction of the front upright and/or rear upright and is affixed, with a first end, to the front upright and/or rear upright in a predefined mounting position, and wherein the height adjustment profile, at the second end, forms a mounting region to which a profiled support element of a support structure is affixable.

* * * * *